(12) United States Patent
Aoyama et al.

(10) Patent No.: US 7,777,390 B2
(45) Date of Patent: Aug. 17, 2010

(54) SHORT-CIRCUIT MEMBER ASSEMBLY, COMMUTATOR, AND MOTOR

(75) Inventors: Tomohiro Aoyama, Kosai (JP); Yasuhide Ito, Hamamatsu (JP); Toshio Yamamoto, Kosai (JP)

(73) Assignee: Asmo Co., Ltd, Shizuoka-Ken (JP)

( * ) Notice: Subject to any disclaimer, the term of this patent is extended or adjusted under 35 U.S.C. 154(b) by 378 days.

(21) Appl. No.: 12/080,300

(22) Filed: Apr. 1, 2008

(65) Prior Publication Data
US 2009/0146526 A1    Jun. 11, 2009

(30) Foreign Application Priority Data

Apr. 3, 2007   (JP)   .............................. 2007-097481
Apr. 3, 2007   (JP)   .............................. 2007-097482

(51) Int. Cl.
*H01R 39/32*   (2006.01)
*H02K 13/04*   (2006.01)

(52) U.S. Cl. ......................... 310/234; 310/204; 310/233

(58) Field of Classification Search ................. 310/234, 310/233, 204, 220, 221, 222
See application file for complete search history.

(56) References Cited

U.S. PATENT DOCUMENTS

2004/0095036 A1 *  5/2004  Yamamoto et al. .......... 310/233
2005/0206264 A1 *  9/2005  Yamamoto et al. .......... 310/216
2006/0208605 A1 *  9/2006  Aoyama et al. ............. 310/264
2007/0069603 A1 *  3/2007  Terada et al. ............... 310/234

FOREIGN PATENT DOCUMENTS

| JP | 2005-137193 |   | 5/2005 |
|----|-------------|---|--------|
| JP | 2005137193 A | * | 5/2005 |
| JP | 2006271188 A | * | 10/2006 |
| JP | 2006325318 A | * | 11/2006 |
| JP | 2008054397 A | * | 3/2008 |

* cited by examiner

*Primary Examiner*—Quyen Leung
*Assistant Examiner*—Alex W Mok
(74) *Attorney, Agent, or Firm*—Wolf, Greenfield & Sacks, P.C.

(57) ABSTRACT

A short-circuit member assembly for short-circuiting a plurality of segments arranged in a circumferential direction is disclosed. The short-circuit member assembly includes first and second short-circuit member groups that are superimposed with each other. The first short-circuit member group includes m first terminals, which are superimposed and joined with m first terminals included in the second short-circuit member group to form m first-terminal joint portions. The m first-terminal joint portions and the remaining first terminals in the short-circuit member groups are arranged in the circumferential direction and connected to the segments. All of the second terminals in the first short-circuit member group are superimposed and joined with all of the second terminals included in the second short-circuit member group.

12 Claims, 28 Drawing Sheets

SHORT-CIRCUIT MEMBER ASSEMBLY, COMMUTATOR, AND MOTOR

BACKGROUND OF THE INVENTION

The present invention relates to a short-circuit member assembly for short-circuiting predetermined segments, a commutator including the short-circuit member assembly, and a motor including the commutator.

A motor including a commutator, such as a direct current (DC) motor, includes power feeding brushes and an armature. The power feeding brushes slide along and contact the commutator. The armature includes armature coils and an armature core. The armature coils are electrically coupled to the commutator. The armature core has a plurality of teeth, around which the armature coils are wound. A plurality of segments are arranged on the outer circumference of the commutator. The number of the segments is normally the least common denominator of the number of magnetic poles of magnets used in a stator (the number of field poles) and the number of the teeth (the number of salient poles). In such a commutator, predetermined segments must be short-circuited so that they have the same potential. For example, Japanese Laid-Open Patent Publication No. 2005-137193 describes a commutator that integrally includes a plate-like short-circuit member assembly for short-circuiting predetermined segments.

The short-circuit member assembly described in the publication includes first and second shirt-circuit member groups, which are superimposed with each other. Each short-circuit member group includes plate-like short-circuit pieces, the quantity of which is the same as the segments of the commutator. The short-circuit pieces are arranged in the circumferential direction of the commutator. Each short-circuit piece includes an outer terminal, which is arranged outward in the radial direction, an inner terminal, which is arranged inward from the outer terminal in the radial direction, and a connecting portion, which connects the outer terminal and the inner terminal. Each outer terminal includes an engagement portion, which extends outward in the radial direction. The outer terminals of the first short-circuit member group and the outer terminals of the second short-circuit member group are superimposed with each other, and the inner terminals of the first short-circuit member group and the inner terminals of the second short-circuit member group are superimposed with each other. The outer terminals that are superimposed with each other are joined with one another, and the inner terminals that are superimposed with each other are joined with one another. This integrates the short-circuit member groups. The engagement portions each have a basal end connected to the corresponding segment. The engagement portions each project outward in the radial direction from the corresponding segment. The armature coils each have a distal end engaged with a predetermined one of the engagement portions.

The short-circuit member assembly described above is manufactured by superimposing and joining all the outer terminals included in the first short-circuit member group and all the outer terminals included in the second short-circuit member group, and superimposing and joining all the inner terminals included in the first short-circuit member group and all the inner terminals included in the second short-circuit member group on top of each other. In this case, many portions of the two short-circuit member groups must be joined with one another. This complicates the manufacture of the short-circuit member assembly.

SUMMARY OF THE INVENTION

It is an object of the present invention to provide a short-circuit assembly, a commutator including the short-circuit assembly, and a motor including the commutator that simplifies the process of joining short-circuit member groups with each other.

One aspect of the present invention provides a short-circuit member assembly for short-circuiting a plurality of segments arranged in a circumferential direction. The segments include m sets of n segments, where m and n are integers. The short-circuit member assembly includes a first short-circuit member group and a second short-circuit member group superimposed with each other. The first short-circuit member group includes a plurality of first short-circuit pieces arranged in the circumferential direction. The second short-circuit member group includes a plurality of second short-circuit pieces arranged in the circumferential direction. Each of the short-circuit pieces includes a first terminal, a second terminal located outward or inward in a radial direction from the first terminal and separated from the first terminal in the circumferential direction, and a connecting portion connecting the second terminal to the first terminal. Each of the first and second short-circuit member groups includes the short-circuit pieces, the quantity of which is obtained by multiplying (n−1) by m, to short-circuit the n segments in each of the sets with (n−1) first short-circuit pieces in the first short-circuit member group and (n−1) second short-circuit pieces in the second short-circuit member group. Further, m first terminals in the first short-circuit member group and m first terminals in the second short-circuit member group are superimposed with each other and joined to form m first-terminal joint portions. The m first-terminal joint portions and remaining first terminals in the first and second short-circuit member groups are arranged in the circumferential direction and connected to the segments. All of the second terminals in the first short-circuit member group and all of the second terminals in the second short-circuit member group are superimposed and joined with each other.

A second aspect of the present invention provides a commutator including a plurality of segments arranged in a circumferential direction and a short-circuit member assembly. The segments include m sets of n segments, where m and n are integers. The short-circuit member assembly includes a first short-circuit member group and a second short-circuit member group superimposed with each other. The first short-circuit member group includes a plurality of first short-circuit pieces arranged in the circumferential direction. The second short-circuit member group includes a plurality of second short-circuit pieces arranged in the circumferential direction. Each of the short-circuit pieces includes a first terminal, a second terminal located outward or inward in a radial direction from the first terminal and separated from the first terminal in the circumferential direction, and a connecting portion connecting the second terminal to the first terminal. Each of the first and second short-circuit member groups includes the short-circuit pieces, the quantity of which is obtained by multiplying (n−1) by m, to short-circuit the n segments in each of the sets with (n−1) first short-circuit pieces in the first short-circuit member group and (n−1) second short-circuit pieces in the second short-circuit member group. Further, m first terminals in the first short-circuit member group and m first terminals in the second short-circuit member group are superimposed with each other and joined to form m first-terminal joint portions. The m first-terminal joint portions and remaining first terminals in the first and second short-circuit member groups are arranged in the circumferential direction and connected to the segments. All of the second terminals in the first short-circuit member group and all of the second terminals in the second short-circuit member group are superimposed and joined with each other.

A third aspect of the present invention provides a motor. The motor includes a stator, an armature, and a pair of power feeding brushes. The stator includes a plurality of magnets. A armature is rotatable and arranged in the stator. The armature includes a rotation shaft, an armature core, and a commutator. A plurality of armature coils are wound and fixed to the rotation shaft. The commutator is the commutator according to the second aspect and is fixed to the rotation shaft. The pair of power feeding brushes slide along and contact the commutator.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A first embodiment of the present invention will now be described with reference to FIGS. 1 to 8.

Figure 1:
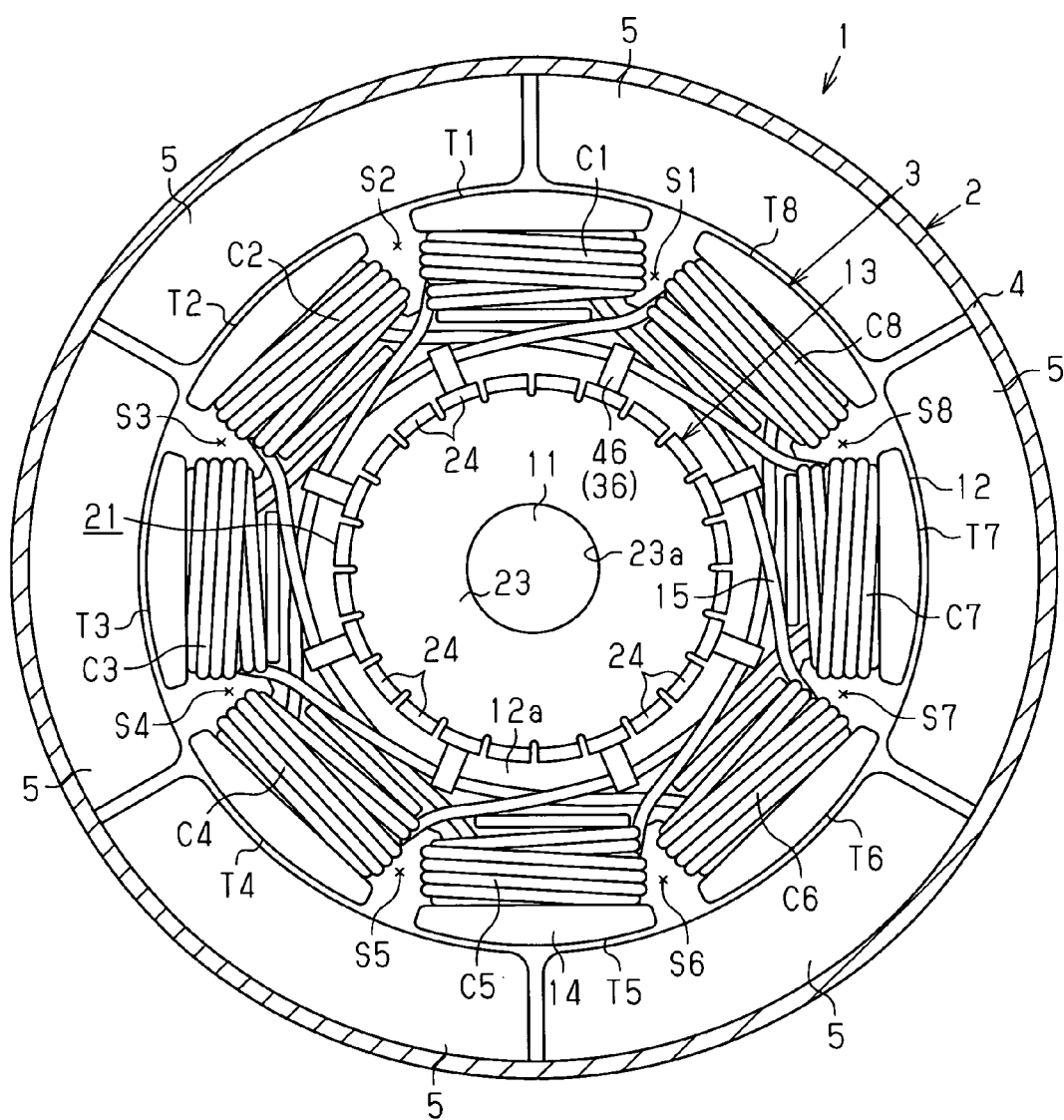
FIG. 1 is a cross-sectional view of a DC motor according to a first embodiment of the present invention taken in a radial direction of the motor.
Figure 2:
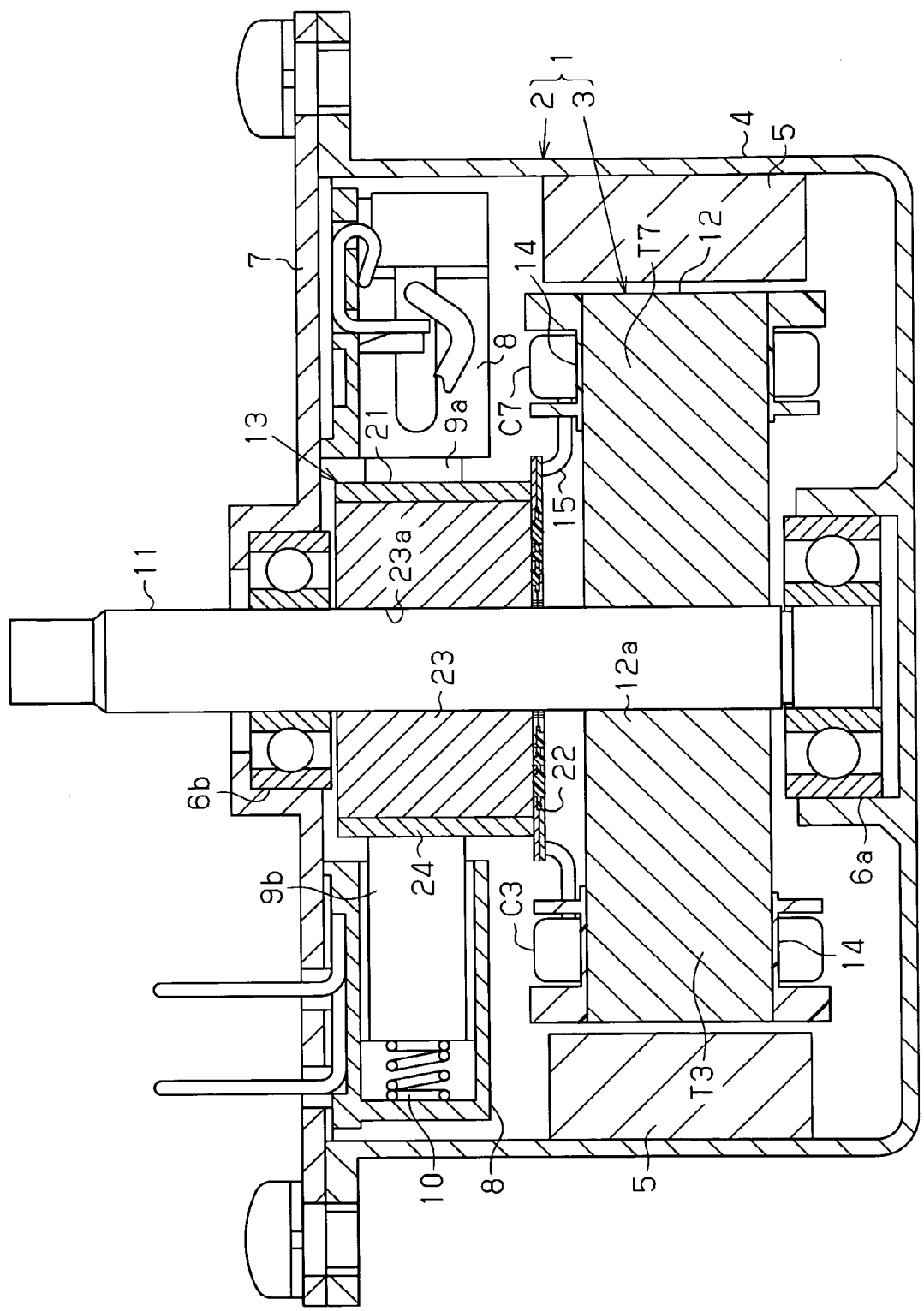
FIG. 2 is a cross-sectional view of the DC motor in FIG. 1 taken in an axial direction of the motor.

As shown in FIG. 1, a direct current (DC) motor 1, which functions as a motor, includes a stator 2 and an armature 3. The armature 3 is arranged inside the stator 2. The stator 2 includes a yoke housing 4, which is a cylinder having a closed end. Six magnets 5 are arranged and fixed to the inner circumferential surface of the stator 2 at equal angular intervals in the circumferential direction. Thus, the stator 2 has six magnetic poles. As shown in FIG. 2, a bearing 6a is fixed to the center of the bottom of the yoke housing 4. The open part of the yoke housing 4 is closed by an end frame 7, which is a circular plate. A bearing 6b, which is paired with a bearing 6a, is fixed to the center of the end frame 7. Three pairs of brush holders 8 (only one pair is shown in FIG. 2) are fixed to a surface of the end frame 7 near the yoke housing 4. Each brush holder 8 is a square tube that extends in the radial direction. The brush holders 8 are spaced from one another in the circumferential direction. A positive pole brush 9a is accommodated in one brush holder 8 of each pair, and a negative pole brush 9b is accommodated in the other brush holder 8 of each pair. The positive pole brushes 9a and the negative pole brushes 9b are pressed inward in the radial direction by compression coil springs 10. The positive pole brushes 9a and the negative pole brushes 9b are supplied with current from an external power supply (not shown).

The armature 3, which is surrounded by the six magnets 5, includes a rotation shaft 11. The rotation shaft 11 is rotatably supported by the two bearings 6a and 6b. The armature 3 includes an armature core 12 and a commutator 13, which are fixed to the rotation shaft 11, and a plurality of coils C1 to C8 (refer to FIG. 1), which are wound around the armature core 12.

Figure 3:
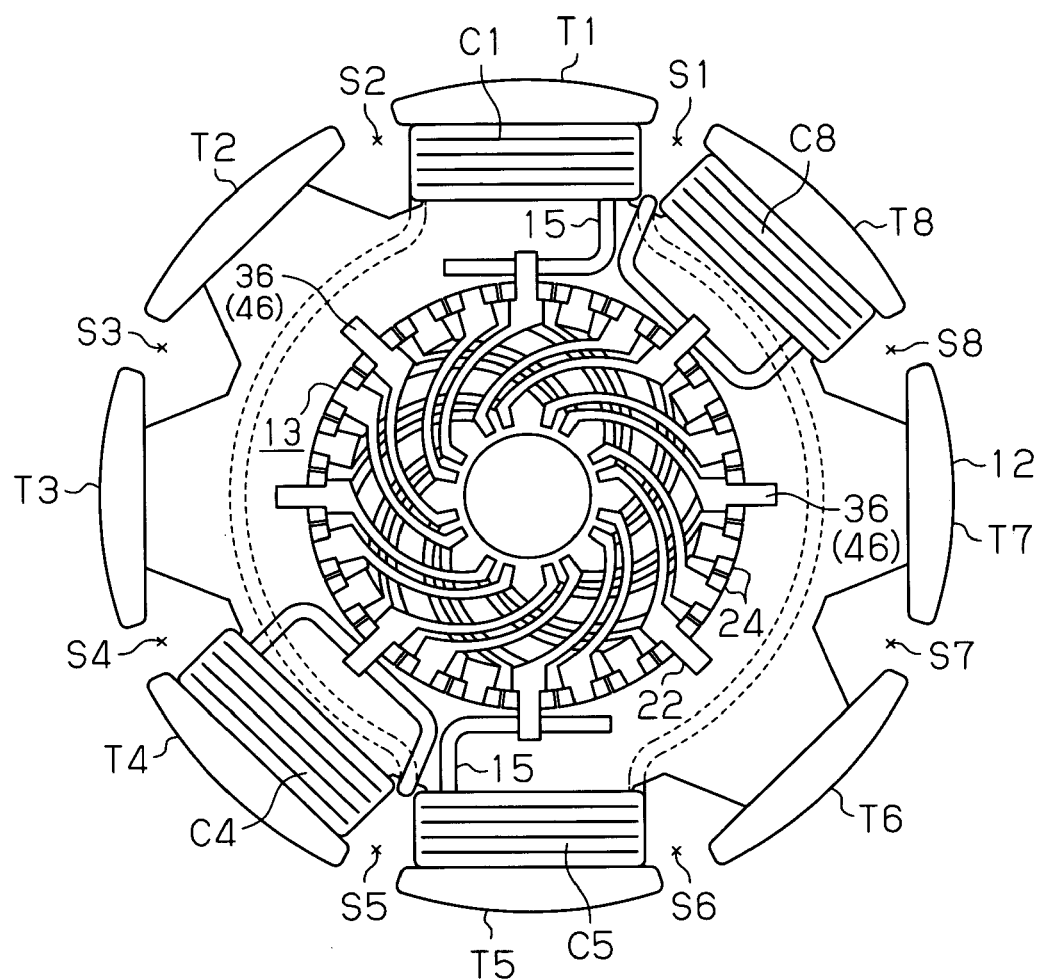
FIG. 3 is a diagram describing how coils are wound around teeth of the DC motor of FIG. 1.

The armature core 12 is fixed to a portion of the rotation shaft 11 near the bearing 6a, that is, a basal end portion of the rotation shaft 11. As shown in FIG. 1, the armature core 12 includes a cylindrical fixed portion 12a and eight teeth T1 to T8, which are formed integrally. The basal end of the rotational axis 11 is press-fitted to the fixed portion 12a. The teeth T1 to T8 extend radially outward from the fixed portion 12a. Slots S1 to S8 are formed between the adjacent teeth T1 to T8 in the circumferential direction. As shown in FIG. 2, two insulators 14 sandwich each of the teeth T1 to T8 in the axial direction. Each insulator 14 covers the armature core 12 except for portions other than the inner and outer circumferential surfaces. A wire 15 is wound around the teeth T1 to T8 via the insulators 14. The wire 15 is wound by concentrated winding. As a result, the armature core 12 includes eight coils C1 to C8. In detail, as shown in FIG. 3, the wire 15 that is wound around the tooth T1 in a plurality of windings form the coil C1 passes by the tooth T2 and the tooth T3 along an end surface of the armature core 12 opposite to the commutator 13 (end surface that is hidden in FIG. 3) to be wound around the tooth T4, which is separated from the tooth T1 by an angle of 135 degrees in the counterclockwise direction, in a plurality of windings to form the coil C4. In the same manner, the wire 15 that is wound around the tooth T5 in a plurality of windings to form the coil C5 passes through the tooth T6 and the tooth T7 along the end surface of the armature core 12 opposite to the commutator 13 (end surface that is hidden in FIG. 3), and is then wound around the tooth T8, which is separated from the tooth T5 by an angle of 135 degrees in the counterclockwise direction, in a plurality of windings to form the coil C8. The wire 15 is wound in the same manner around the teeth T2, T3, T6, and T7 to form the coils C2, C3, C6, and C7 (refer to FIG. 1). The wire 15 is wound around the teeth T1 to T8 in the same direction to form the coils C1 to C8. FIG. 3 does not show the insulators 14. The armature 3 includes the eight teeth T1 to T8. In other words, the armature 3 has eight salient poles.

As shown in FIG. 2, the commutator 13 is fixed to the rotation shaft 11 between the armature core 12 and the bearing 6b. The commutator 13 includes a commutator body 21, which is directly fixed to the rotation shaft 11, and a short-circuit member assembly 22, which is a flat plate fixed to one end of the commutator body 21.

Figure 4:
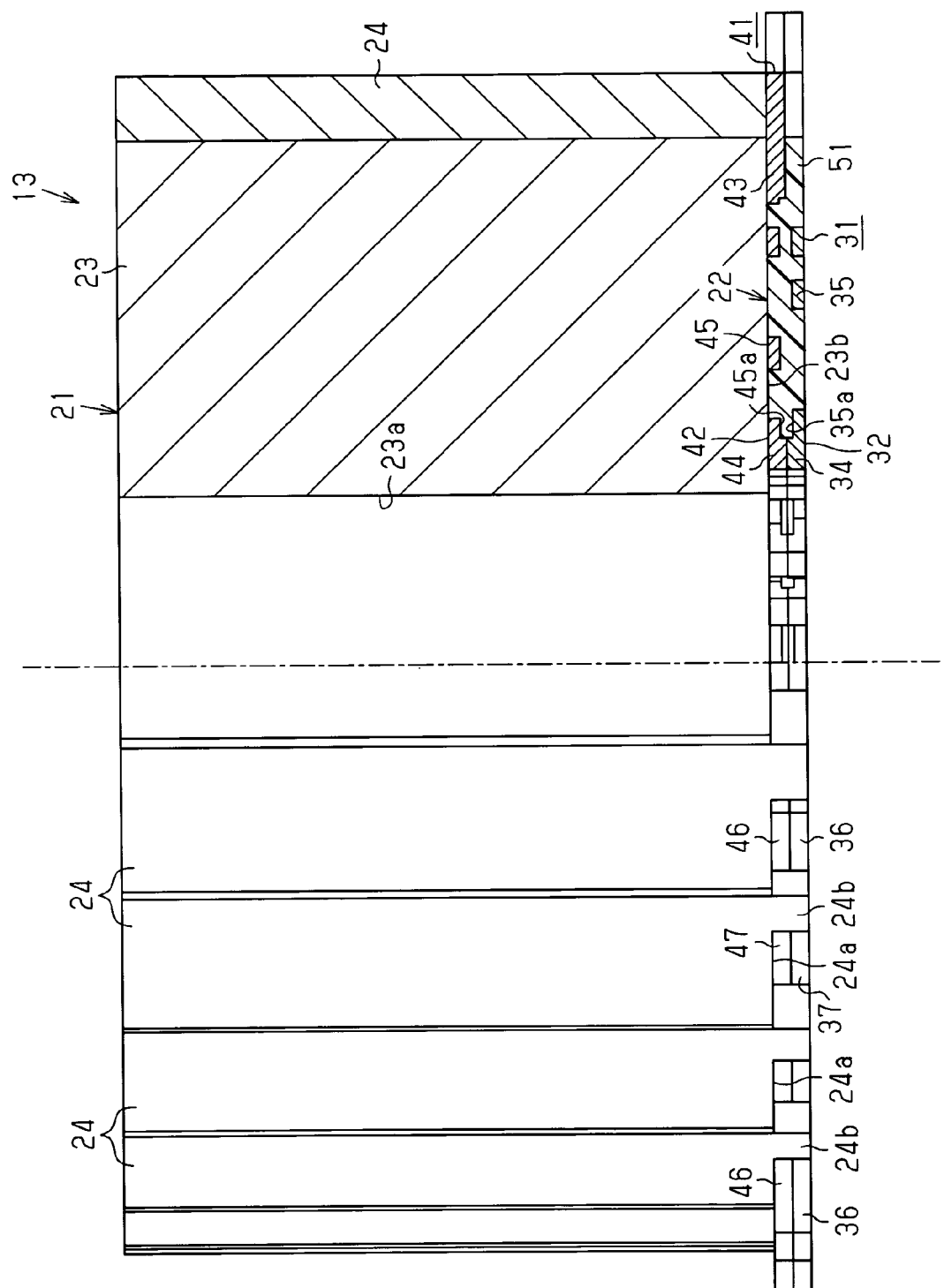
FIG. 4 is a semi-cross-sectional view of a commutator of the first embodiment included in the DC motor shown in FIG. 1.

As shown in FIG. 4, the commutator body 21 includes a cylindrical fixture insulator 23 and twenty four segments 24.

The segments 24 are fixed to the outer circumferential surface of the fixture insulator 23. The fixture insulator 23 is made of a synthetic resin material having insulating properties. A press-fitting hole 23a extends axially through the radial center of the fixture insulator 23. The right half of FIG. 4 is a cross-sectional view taken along line 4-4 in FIG. 5. As shown in FIG. 2, the rotation shaft 11 is press-fitted to the press-fitting hole 23a. This fixes the commutator 13 to the rotation shaft 11.

The segments 24 are made of a conductive metal material. Each segment 24 is generally rectangular. As shown in FIG. 1, each segment 24 curves along the outer circumferential surface of the fixture insulator 23 as viewed in the axial direction of the commutator 13. Each segment 24 is fixed to the outer circumferential surface of the fixture insulator 23 so that its longitudinal direction coincides with the axial direction of the fixture insulator 23. Gaps are formed between adjacent ones of the segments 24 in the circumferential direction. As shown in FIG. 4, each segment 24 lower end defining an arrangement surface 24a, which is planar and orthogonal to the central axis of the fixture insulator 23. A positioning pin 24b, which extends downward in the axial direction of the fixture insulator 23, is formed on one edge portion (right edge portion in FIG. 4) in the circumferential direction of the arrangement surface 24. The positioning pin 24b is formed integrally with the arrangement surface 24a. The arrangement surface 24a is flush with an end surface 23b of the fixture insulator 23. Each positioning pin 24b projects downward from the end surface 23b of the fixture insulator 23.

Figure 5:
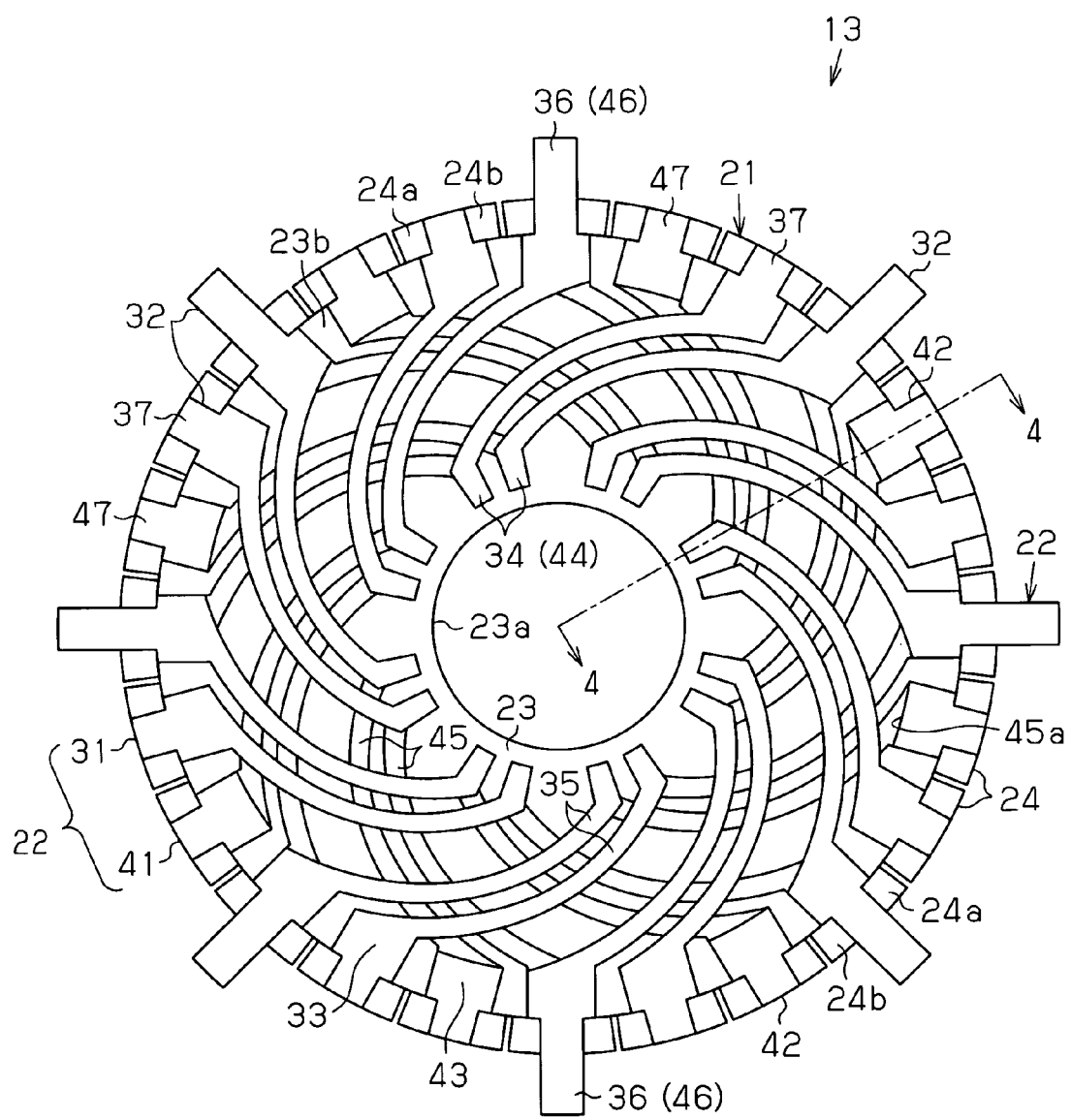
FIG. 5 is a bottom view of the commutator shown in FIG. 4.

As shown in FIGS. 4 and 5, the short-circuit member assembly 22 includes an insulation portion 51, a first short-circuit member group 31, and a second short-circuit member group 41. The first short-circuit member group 31 and the second short-circuit member group 41 are arranged to sandwich the insulation portion 51. FIG. 5 does not show the insulation portion 51.

Figure 6A:
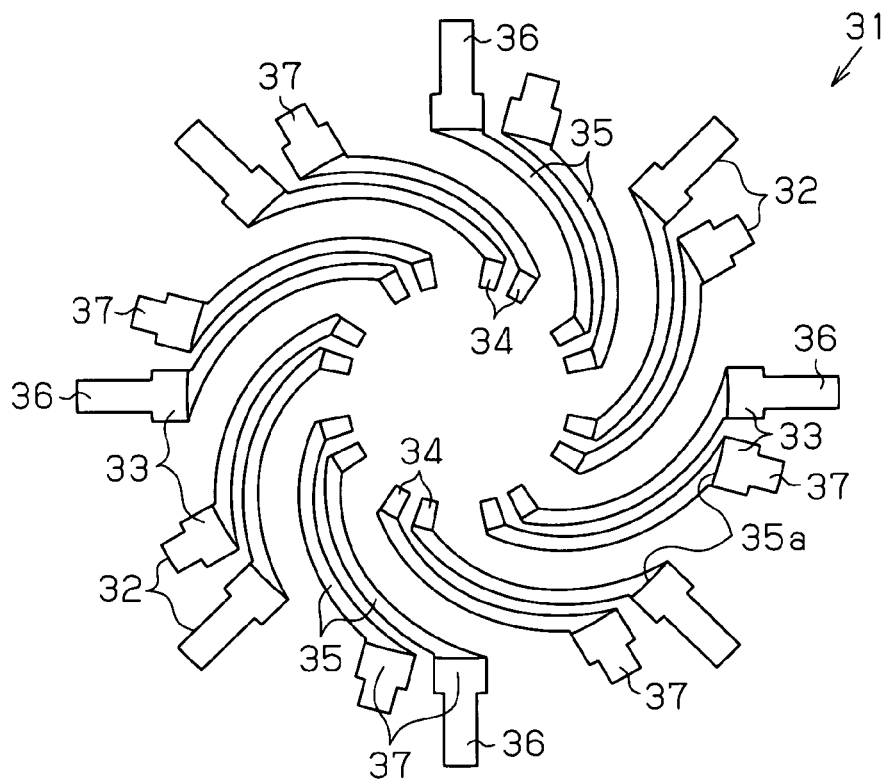
FIG. 6A is a plan view of a first short-circuit member group included in the commutator shown in FIG. 4.

As shown in FIG. 6A, the first short-circuit member group 31 includes sixteen first short-circuit pieces 32, which are arranged in the circumferential direction of the rotation shaft 11. Each first short-circuit piece 32 has a radially outward end defining a first outer terminal 33, which functions as a first terminal. The first outer terminal 33 is a generally square, plate-like member. Each first short-circuit piece 32 has a radially inward end defining a first inner terminal 34, which functions as a second terminal. The first inner terminal 34 is a generally trapezoidal, plate-like member. Each first short-circuit piece 32 includes a first connecting portion 35, which functions as a connecting portion, between the first outer terminal 33 and the first inner terminal 34. The first connecting portion 35 is band-like.

As shown in FIG. 5, the width of each first outer terminal 33 in the circumferential direction is smaller than the width of each segment 24 in the circumferential direction. Each first connecting portion 35 extends along an involute curve. More specifically, the first connecting portion 35 is inclined with respect to a straight line extending in the radial direction. As a result, the first outer terminal 33 of each first short-circuit piece 32 is separated from the position of the first inner terminal 34 by a predetermined angle toward one side in the circumferential direction. In the present embodiment, the first connecting portion 35 of each first short-circuit piece 32 connects one first outer terminal 33 to one first inner terminal 34 arranged at a position separated from the position of the first outer terminal 33 by an angle of 60 degrees in the clockwise direction in FIG. 6A. Further, as shown in FIG. 4, a first spacing recess 35a is formed on one end surface (end surface facing the second short-circuit member group 41) of each first connecting portion 35 in the thicknesswise direction. As a result, the first connecting portion 35 is thinner than the first outer terminal 33 and the first inner terminal 34.

As shown in FIG. 6A, the first outer terminals 33 of eight of the sixteen first short-circuit pieces 32 each include a first engagement portion 36, which projects outward in the radial direction. The first engagement portion 36 is formed integrally with the first outer terminal 33. Every second one of the first short-circuit pieces 32 in the circumferential direction includes the first engagement portion 36. The first engagement portion 36 is a generally square, plate-like member. The length of the first engagement portion 36 in the radial direction is greater than the thickness of the segment 24. The first outer terminals 33 of the remaining eight first short-circuit pieces 32 include a first connecting portion 37, which projects outward in the radial direction. The first connecting portion 37 is formed integrally with the first outer terminal 33. The first connecting portion 37 is a generally square, plate-like member. The length of the first connecting portion 37 in the radial direction is substantially equal to the thickness of the segment 24. As a result, the first engagement portions 36 are longer in the radial direction than the first connecting portions 37.

Among the sixteen first short-circuit pieces 32 with the above-described structure, the first short-circuit pieces 32 including the first engagement portions 36 and the first short-circuit pieces 32 including the first connecting portions 37 are arranged alternately in the circumferential direction. In detail, the eight first short-circuit pieces 32 including the first engagement portions 36 are arranged at equal angular intervals (intervals of 45 degrees in the present embodiment) in the circumferential direction. Each first short-circuit piece 32 including the first connecting portion 37 is arranged between two adjacent ones of the first short-circuit pieces 32 including the first engagement portions 36 in the circumferential direction. The eight first short-circuit pieces 32 including the first connecting portions 37 are arranged at equal angular intervals (intervals of 45 degrees in the present embodiment) in the circumferential direction. Gaps are formed between the first short-circuit pieces 32 including the first engagement portions 36 and the first short-circuit pieces 32 including the first connecting portions 37 that are adjacent to the first short-circuit pieces 32 including the first engagement portions 36 in the counterclockwise direction. The gap between the two adjacent first short-circuit pieces 32 is large enough to permit the arrangement of a single first short-circuit piece 32. The sixteen first outer terminals 33 are arranged in the circumferential direction, and the sixteen first inner terminals 34 are arranged in the circumferential direction.

Figure 6B:
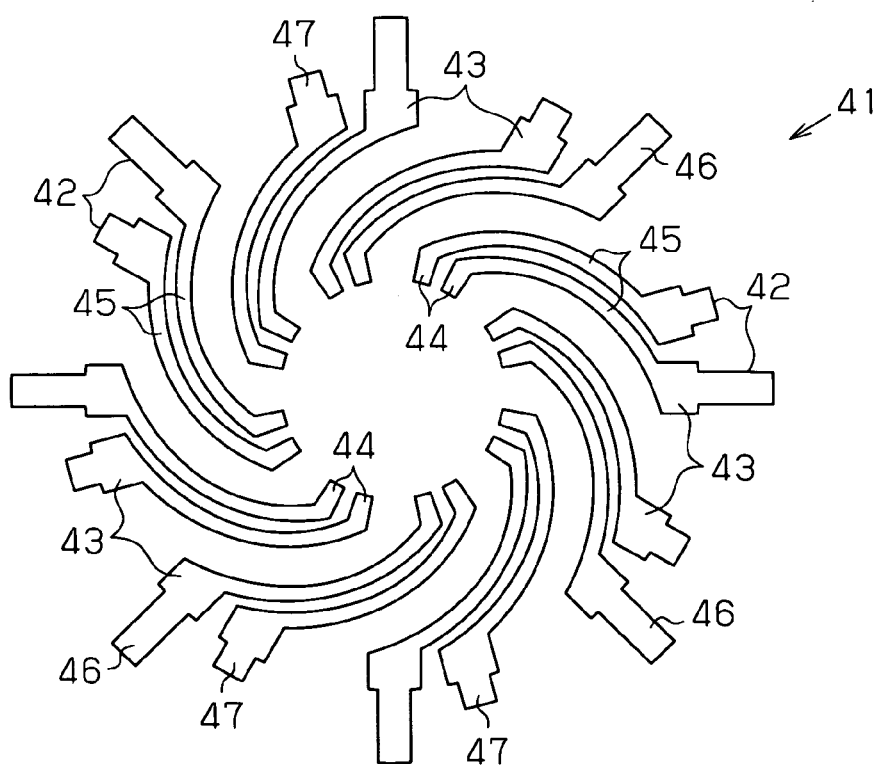
FIG. 6B is a plan view of a second short-circuit member group included in the commutator shown in FIG. 4.

As shown in FIG. 6B, the second short-circuit member group 41 has the same shape as the first short-circuit member group 31 but is reverse to the first short-circuit member group 31. Thus, the second short-circuit pieces 42 included in the second short-circuit member group 41 are identical to the first short-circuit pieces 32 included in the first short-circuit member group 31. More specifically, each second short-circuit piece 42 includes a second outer terminal 43, which functions as a first terminal, a second inner terminal 44, which functions as a second terminal, and a second connecting portion 45, which functions as a connecting portion. The second outer terminal 43 has the same shape as the first outer terminal 33 of the first short-circuit piece 32. The second inner terminal 44 has the same shape as the first inner terminal 34 of the first short-circuit piece 32. The second connecting portion 45 has the same shape as the first connecting portion 35 of the first short-circuit piece 32. As shown in FIG. 4, a second spacing recess 45a is formed on one end surface (end surface facing the first short-circuit member group 31) of each second connecting portion 45 in the thicknesswise direction. As a result, the second connecting portion 45 is thinner than the second outer terminal 43 and the second inner terminal 44. Further, the second outer terminals 43 of eight of the sixteen second short-circuit pieces 42 each include a second engagement portion 46, which projects outward in the radial direction. The second engagement portion 46 is formed integrally with the second outer terminal 43. Among the sixteen second short-circuit pieces 42, every second one of the short-circuit pieces 42 arranged in the circumferential direction includes the second engagement portion 46. The remaining eight second short-circuit pieces 42 each include a second connecting portion 47, which projects outward in the radial direction. The second connecting portion 47 is formed integrally with the second outer terminal 43. The second engagement portions 46 have the same shape as the first engagement portions 36 of the first short-circuit pieces 32 included in the first short-circuit member group 31. The second connecting portions 47 have the same shape as the first connecting portions 37 of the first short-circuit pieces 32 included in the first short-circuit member group 31.

As shown in FIG. 6B, among the sixteen short-circuit pieces 42 with the above-described structure, the second short-circuit pieces 42 including the second engagement portions 46 and the second short-circuit pieces 42 including the second connecting portions 47 are arranged alternately in the circumferential direction. In detail, the eight second short-circuit pieces 42 including the second engagement portions 46 are arranged at equal angular intervals (at intervals of 45 degrees in the present embodiment) in the circumferential direction. Each second short-circuit piece 42 including the second engagement portion 46 is arranged between two second short-circuit pieces 42 including the second connecting portions 47 adjacent in the circumferential direction. The second short-circuit pieces 42 including the second connecting portions 47 are arranged at equal angular intervals (at intervals of 45 degrees in the present embodiment) in the circumferential direction. Gaps are formed between the eight second short-circuit pieces 42 including the second engagement portions 46 and the second short-circuit pieces 42 including the second connecting portions 47 that are adjacent to the second short-circuit pieces 42 including the second engagement portions 46 in the clockwise direction. The gap between the two adjacent second short-circuit pieces 42 is as large enough to permit arrangement of a single short-circuit piece 42. The sixteen second outer terminals 43 are arranged in the circumferential direction, and the sixteen second inner terminals 44 are arranged in the circumferential direction. As shown in FIG. 6B, the first connecting portion 45 of each second short-circuit piece 42 connects one second outer terminal 43 to one second inner terminal 44 separated from the position of the second outer terminal 43 by an angle of 60 degrees in the counterclockwise direction.

The first short-circuit member group 31 and the second short-circuit member group 41 are punched out of a conductive plate, such as a copper plate. As shown in FIG. 4, the first short-circuit member group 31 and the second short-circuit member group 41 are superimposed with each other in a manner that the first spacing recesses 35a and the second spacing recesses 45a face each other in the plate thicknesswise direction. Further, as shown in FIG. 5, the first short-circuit member group 31 and the second short-circuit member group 41 are superimposed with each other in a manner that the first engagement portions 36 and the second engagement portions 46 come in contact with each other and the first inner terminals 34 and the second inner terminals 44 come in contact with each other. More specifically, the short-circuit member groups 31 and 41 are superimposed with each other in a manner that the eight first outer terminals 33 including the first engagement portions 36 come in contact with the second outer terminals 43 including the second engagement portions 46 and the sixteen first inner terminals 34 come in contact with the sixteen second inner terminals 44. When the first short-circuit member group 31 and the second short-circuit member group 41 are superimposed with each other, the first outer terminals 33 including the first connecting portions 37 and the second outer terminals 43 including the second connecting portions 47 are arranged adjacent to each other without overlapping each other in the circumferential direction between the first outer terminals 33 (second outer terminals 43) including the first engagement portions 36 adjacent in the circumferential direction. When the first and second short-circuit member groups 31 and 41 superimposed with each other as viewed in the plate thicknesswise direction, a total of twenty four first and second outer terminals 33 and 43, the quantity of which is the same as the segments 24, are arranged at equal angular intervals (at intervals of 15 degrees in the present embodiment) in the circumferential direction.

Also, the first short-circuit member group 31 and the second short-circuit member group 41, which is reverse to the first short-circuit member group 31, are superimposed with each other. Thus, the first connecting portions 35 and the second connecting portions 45 extend across each other as viewed in the plate thicknesswise direction. Further, as shown in FIG. 4, the first spacing recesses 35a and the second spacing recesses 45a prevent the first connecting portions 35 and the second connecting portions 45 from contacting each other in the superimposing direction.

As shown in FIG. 5, in a state in which the first short-circuit member group 31 and the second short-circuit member group 41 are superimposed with each other, the first outer terminals 33 and the second outer terminals 43 that are in contact with each other are joined to each other through welding. The first inner terminals 34 and the second inner terminals 44 that are in contact with each other are joined to each other through welding. The first outer terminals 33 and second outer terminals 43 and the first inner terminals 34 and second inner terminals 44 are joined through a joining process included in a manufacturing process of the DC motor 1. In the joining process, the joining is preferably performed through welding, or more preferably, through tungsten-inert-gas (TIG) welding or spot welding. Portions of the first and second outer terminals 33 and 34 that are in contact with each other and joined to each other correspond to first-terminal joint portions.

The insulation portion 51 is made of an insulating resin material. As shown in FIG. 4, the insulation portion 51 is arranged between the first connecting portions 35 and the second connecting portions 45 that are arranged in the superimposing direction, and also between the first connecting portions 35 adjacent in the circumferential direction and between the second connecting portions 45 adjacent in the circumferential direction. This prevents the first connecting portions 35 and the second connecting portions 45 arranged in the superimposing direction from short-circuiting. Further, this prevents adjacent ones of the first connecting portions 35 in the circumferential direction from short-circuiting and prevents adjacent ones of the second connecting portions 35 in the circumferential direction from short-circuiting.

Figure 7:
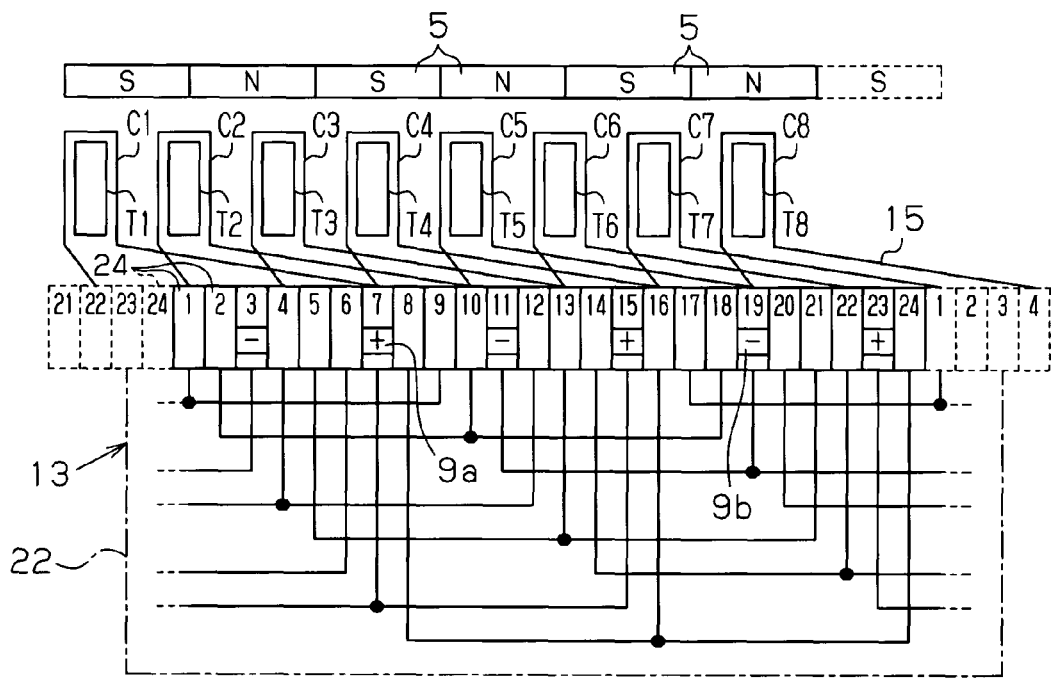
FIG. 7 is a connection wiring diagram of the DC motor according to the first embodiment.

The short-circuit member assembly 22 with the above-described structure is arranged in a manner that the outer surface of the short-circuit member group 41 comes in contact with the end surfaces 23b of the fixture insulators 23 of the commutator body 21. When the short-circuit member assembly 22 is arranged on the commutator body 21, the basal ends of the first connecting portions 37, the second connecting portions 47, and the second engagement portions 46 come in contact with the arrangement surfaces 24a of the segments 24, and the first connecting portions 37, the second connecting portions 47, and the first and second engagement portions 36 and 46 that are superimposed with each other come in contact with the positioning pins 24b. The engagement portions 36 and 46 that come in contact with the segments 24 are electrically coupled to the segments 24 through welding. The connecting portions 37 and 47 that come in contact with the segments 24 are electrically coupled to the segments 24 through welding. As a result, the outer terminals 33 and 43 are electrically coupled to the corresponding segments 24 via the engagement portions 36 and 46 or the connecting portions 37 and 47. Also, the short-circuit member assembly 22 short-circuits each set of segments 24 that are arranged at each angular interval of 120 degrees in the circumferential direction. The short-circuited segments 24 have the same potential. As shown in FIG. 7, the segments 24 are given segment numbers 1 to 24 sequentially in the counterclockwise direction (counterclockwise direction in FIG. 1) from the segment 24 facing the tooth T2 in substantially the radial direction and connected to the engagement portions 36 and 46. FIG. 7 shows, in a simplified manner, the wire 15 that is wound around each of the teeth T1 to T8 in a plurality of windings. The short-circuit member assembly 22 in the present embodiment short-circuits the segments 24 denoted as segment numbers 1, 9, and 17 so that they have the same potential, and short-circuits the segments 24 denoted as segment numbers 2, 10, and 18 so that they have the same potential, and short-circuits the segments 24 denoted as segment numbers 3, 11, and 19 so that they have the same potential. The short-circuit member assembly 22 also short-circuits the segments 24 denoted as segment numbers 4, 12, and 20 so that they have the same potential, short-circuits the segments 24 denoted as segment numbers 5, 13, and 21 so that they have the same potential, and short-circuits the segments 24 denoted as segment numbers 6, 14, and 22 so that they have the same potential. Further, the short-circuit member assembly 22 short-circuits the segments 24 denoted as segment numbers 7, 15, and 23 so that they have the same potential, and short-circuits the segments 24 denoted as segment numbers 8, 16, and 24 so that they have the same potential.

As shown in FIG. 5, each set of three segments 24 is short-circuited using two of the sixteen short-circuit pieces 32 included in the first short-circuit member group 31 and two of the sixteen short-circuit pieces 42 included in the second short-circuit member group 41. More specifically, to short-circuit each set of n segments (n being a positive integer), (n−1) short-circuit pieces in each of the short-circuit member groups 31 and 41 are used. Thus, the number of short-circuit pieces included in each short-circuit member group is required to be (n−1) multiplied by the number of sets of segments that are short-circuited to have the same potential. In the present embodiment, the number of segments 24 of each set that are short-circuited to have the same potential is 3. In this case, two first short-circuit pieces 32 in the first short-circuit member group 41 are used to short-circuit the three segments 24. In the same manner, two short-circuit pieces 42 in the second short-circuit member group 41 are used to short-circuit the three segments 24. Further, the stator 2 has six magnetic poles, and the armature core 12 has eight salient poles. Therefore, the total number of the segments 24 is 24, which is the least common multiple of 6 and 8. The number n of segments 24 of each set that are short-circuited to have the same potential is 3. Thus, the number n of sets of segments 24 that are short-circuited to have the same potential is 8. Accordingly, the number of the first short-circuit pieces 32 included in the first short-circuit member group 31 is 16, which is calculated by multiplying 2 corresponding to (n−1) by 8 corresponding to the number m of segments. In the same manner, the number of the second short-circuit pieces 42 included in the second short-circuit member group 41 is 16, which is calculated by multiplying 2 by 8.

In the short-circuit member assembly 22, the two first short-circuit pieces 32 and the two second short-circuit pieces 42, which short-circuit three segments 24 to have the same potential, are arranged alternately in the circumferential direction. Further, the first short-circuit pieces 32 and the second short-circuit pieces 42 are connected in series in a manner that the inner terminals 34 and 44 are joined to one another at more positions than the outer terminals 33 and 43. In detail, in the total of four short-circuit pieces 32 and 42, which short-circuit the three segments 24 to have the same potential, the first inner terminals 34 of the first short-circuit pieces 32 including the first connecting portions 37 are joined to the second inner terminals 44 of the second short-circuit pieces 42 including the second engagement portions 46, and the second outer terminals 43 of the second short-circuit pieces 42 including the second engagement portions 46 are joined to the first outer terminals 33 of the first short-circuit pieces 32 including the first engagement portions 36. Further, the first inner terminals 34 of the first short-circuit pieces 32 including the first engagement portions 36 are joined to the second inner terminals 44 of the second short-circuit pieces 42 including the second connecting portions 47. The short-circuit pieces 32 and 42 that are joined to one another in series are arranged in a generally V-shaped form. Only the joint portions of the short-circuit pieces 32 and 42 corresponding to the vertexes of the V-shape, that is, only the outer terminals 33 and 43 that are joined to one another, include the first and second engagement portions 36 and 46. The short-circuit member assembly 22 includes eight sets of four short-circuit pieces 32 and 42 that are joined in series. The sets of four short-circuit pieces 32 and 42 are arranged in generally V-shaped forms that are identical. The four short-circuit pieces 32 and 42 in each set are arranged at equal angular intervals in the circumferential direction (portions of the short-circuit pieces 32 and 42 corresponding to the vertexes of the V-shape are arranged at equal angular intervals in the circumferential direction).

As shown in FIG. 1, the distal ends of the coils C1 to C8 are connected to the commutator 13 with the above-described structure. The ends of the first engagement portions 36 and the second engagement portions 46 that are superimposed with each other and come in contact with each other are bent back toward the basal end portions to hold the distal ends of the corresponding coils C1 to C8. The distal ends of the coils C1 to C8 are electrically coupled to the corresponding engagement portions 36 and 46 through resistance welding. As shown in FIG. 7, one distal end of the coil C1 is connected to the engagement portions 36 and 46 that are connected to the segment 24 denoted as segment number 22, and the other distal end of the coil C1 is connected to the engagement portions 36 and 46 that are connected to the segment 24 denoted as segment number 7. In the same manner, one distal end of the coil C2 is connected to the engagement portions 36 and 46 that are connected to the segment 24 denoted as segment number 1, and the other distal end of the coil C2 is connected to the engagement portions 36 and 46 that are connected to the segment 24 denoted as segment number 10. One distal end of the coil C3 is connected to the engagement portions 36 and 46 that are connected to the segment 24 denoted as segment number 4, and the other distal end of the coil C3 is connected to the second engagement portion 46 that is connected to the segment 24 denoted as segment number 13. In the same manner, one distal end of the coil C4 is connected to the engagement portions 36 and 46 that are connected to the segment 24 denoted as segment number 7, and the other distal end of the coil C4 is connected to the engagement portions 36 and 46 that are connected to the segment 24 denoted as segment number 16. One distal end of the coil C5 is connected to the engagement portions 36 and 46 that are connected to the segment 24 denoted as segment number 10, and the other distal end of the coil C5 is connected to the engagement portions 36 and 46 that are connected to the segment 24 denoted as segment number 19. In the same manner, one distal end of the coil C6 is connected to the engagement portions 36 and 46 that are connected to the segment 24 denoted as segment number 13, and the other distal end of the coil C6 is connected to the engagement portions 36 and 46 that are connected to the segment 24 denoted as segment number 22. One distal end of the coil C7 is connected to the engagement portions 36 and 46 that are connected to the segment 24 denoted as segment number 16, and the other distal end of the coil C7 is connected to the engagement portions 36 and 46 that are connected to the segment 24 denoted as segment number 1. One distal end of the coil C8 is connected to the engagement portions 36 and 46 that are connected to the segment 24 denoted as segment number 19, and the other distal end of the coil C8 is connected to the engagement portions 36 and 46 that are connected to the segment 24 denoted as segment number 4.

Figure 8:
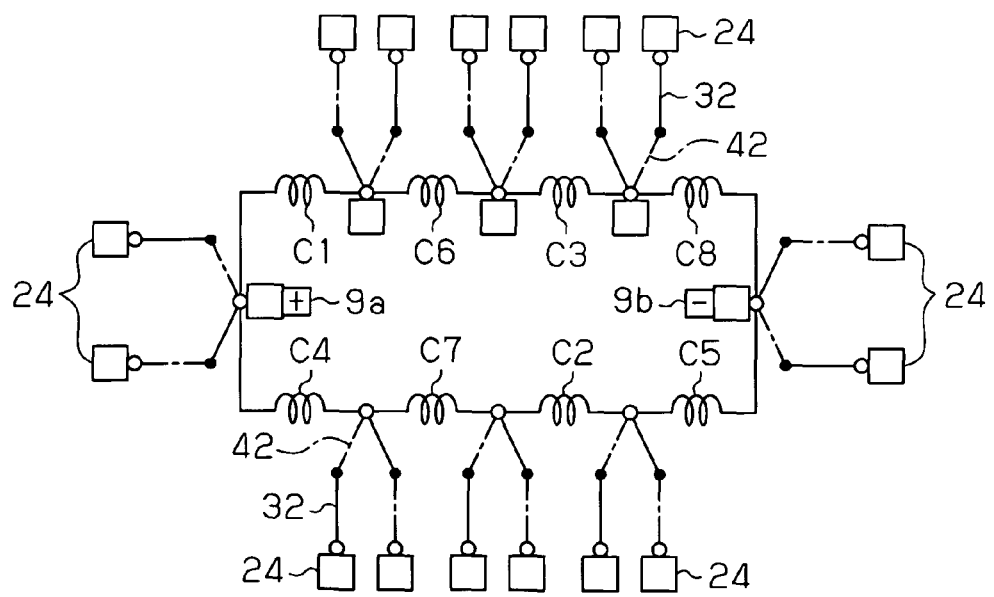
FIG. 8 is a diagram describing the connection between coils in the DC motor according to the first embodiment.

As shown in FIGS. 7 and 8, when the distal ends of predetermined coils C1 to C8 are short-circuited by the short-circuit member assembly 22, the coils C1 to C8 form a parallel circuit via the short-circuit member assembly 22. In FIG. 8, the joint between the first short-circuit piece 32 and the second short-circuit piece 42 is indicated using a black circle, and the joint between the segment 24 and the short-circuit pieces 32 and 42 is indicated using a white circle. For example, when the positive pole brush 9a is in contact with the segment 24 denoted as segment number 7 and the negative pole brush 9b is in contact with the segment 24 denoted as segment number 19, the coils C1, C6, C3, and C8 are connected in series, and the coils C4, C7, C2, and C5 are connected in series. The coils C1, C6, C3, and C8 and the coils C4, C7, C2, and C5 are connected in parallel to the brushes 9a and 9b. In the present embodiment, the distal ends of the coils C1 to C8 are connected to joint portions of a total of four short-circuit pieces 32 and 42 corresponding to the vertexes of the V-shape, which are joined to one another in series to set the three segments 24 to the same potential. More specifically, the distal ends of the coils C1 to C8 are connected to the first and second engagement portions 36 and 46 of the outer terminals 33 and 34 that are joined to one another in the total of four series-connected short-circuit pieces 32 and 42. In this case, current from the positive pole brush 9a and the negative pole brush 9b is either supplied directly from the engagement portions 36 and 46 to the coils C1 to C8 or supplied to each of the coils C1 to C8 via the single first short-circuit piece 32 and the single second short-circuit piece 42.

As shown in FIG. 2, in the armature 3, the magnets 5 and the distal end surfaces of the teeth T1 to T8 face toward each other in the radial direction. The positive pole brush 9a and the negative pole brush 9b come in contact with the outer circumferential surface of the commutator 13 while pressing the outer circumferential surface of the commutator 13. When a power supply (not shown) selectively supplies current to the coils C1 to C8 via the positive pole brush 9a and the negative pole brush 9b, the armature 3 rotates relative to the stator 2. Different segments 24 slide along and contact the positive pole brush 9a and the negative pole brush 9b as the armature 3 rotates. This sequentially rectifies current flowing through the coils C1 to C8.

The present embodiment has the advantages described below.

(1) Each of the first short-circuit member group 31 and the second short-circuit member group 41 includes the sixteen short-circuit pieces 32 and 42. More specifically, the number m of sets of three segments 24 that are set to the same potential in the motor is 8. In this case, two short-circuit pieces included in each of the short-circuit member groups 31 and 41 are used to short-circuit each set of three segments 24. As compared with conventional short-circuit member groups, the short-circuit member groups 31 and 41 include less short-circuit pieces. Further, among the sixteen outer terminals 33 and 43 included in each of the short-circuit member groups 31 and 41, eight outer terminals 33 and 44, the quantity of which is the same as the m sets of segments 24, that is, the eight sets of segments 24, are superimposed on the outer terminals of the other short-circuit member group. Further, the sixteen inner terminals 34 and 44 of each of the short-circuit member groups 31 and 41 are superimposed on the sixteen inner terminals of the other short-circuit member group. The total of eight outer terminals 33 and 43 that are superimposed with each other are joined to each other, and the total of sixteen inner terminals 34 and 44 that are superimposed with each other are joined to each other. As a result, the two short-circuit member groups 31 and 41 that are superimposed with each other are joined at less positions than conventional short-circuit member groups. This simplifies the process for joining the two short-circuit member groups 31 and 41 that are superimposed with each other.

(2) Only the outer terminals 33 and 43 of the two short-circuit pieces 32 and 42 that are arranged in the center of the four series-connected short-circuit pieces 32 and 42 include the engagement portions 36 and 46. The distal ends of the coils C1 to C8 are connected to the engagement portions 36 and 46. As a result, current from the segments 24 to the outer terminals 33 and 43 is either directly supplied from the engagement portions 36 and 46 to the coils C1 to C8 or supplied to the coils C1 to C8 via the two short-circuit pieces 32 and 42. This reduces variations in the number of the short-circuit pieces 32 and 42 through which the current flows when the current is supplied from the segments 24 to the coils C1 to C8. As a result, variations are reduced in electric resistance between the segments 24 and the coils C1 to C8, which occur due to the short-circuit pieces 32 and 42.

A second embodiment of the present invention will now be described with reference to the drawings focusing on the differences from the first embodiment.

Figure 9:
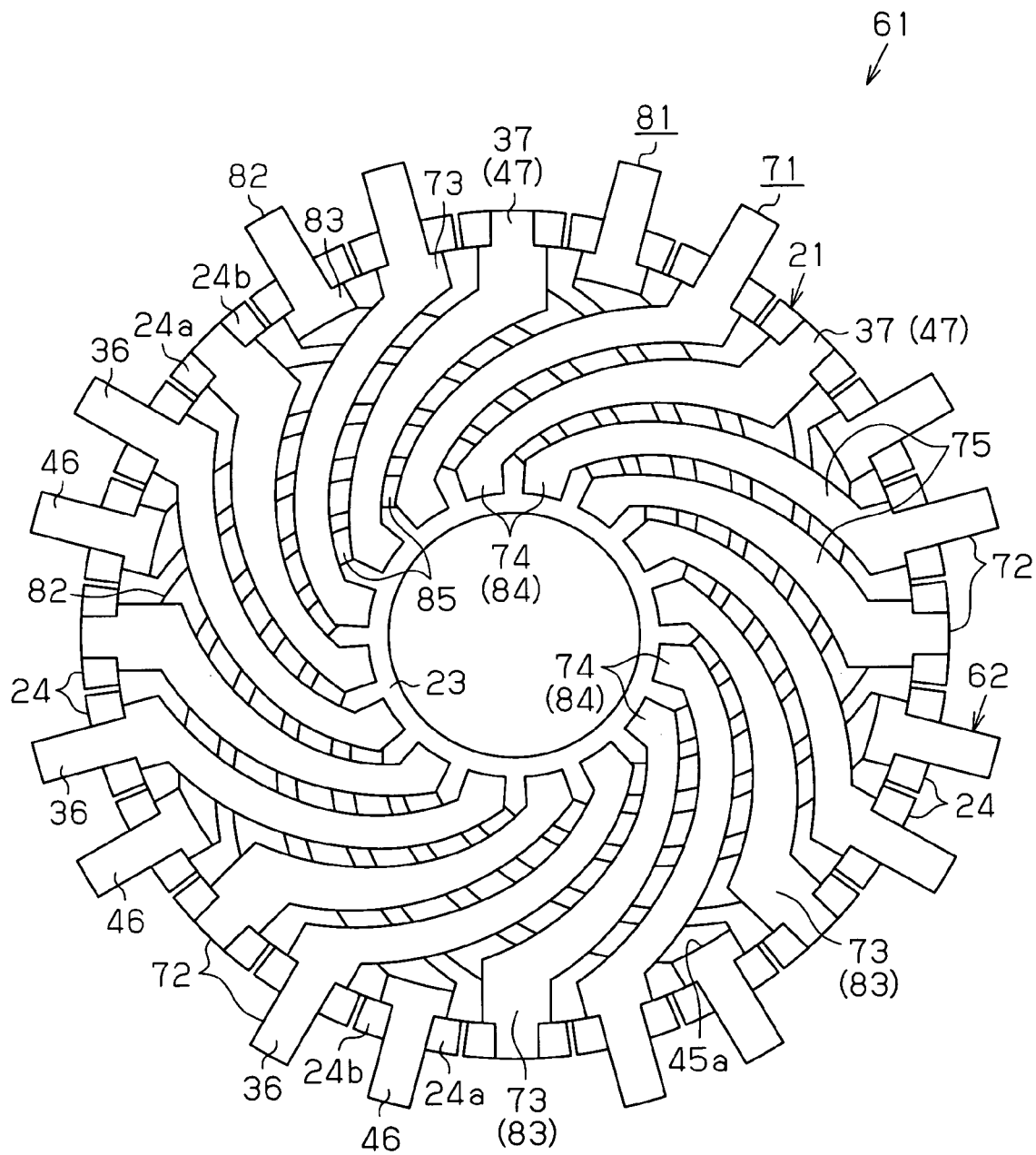
FIG. 9 is a bottom view of a commutator according to a second embodiment of the present invention.

As shown in FIG. 9, a commutator 61 according to the present embodiment includes a commutator body 21 and a short-circuit member assembly 62. The short-circuit member assembly 62 is fixed to the commutator body 21. The short-circuit member assembly 62 includes a first short-circuit member group 71 and a second short-circuit member group 81, which are arranged to sandwich an insulation portion 51. FIG. 9 does not show the insulation portion 51.

Figure 10A:
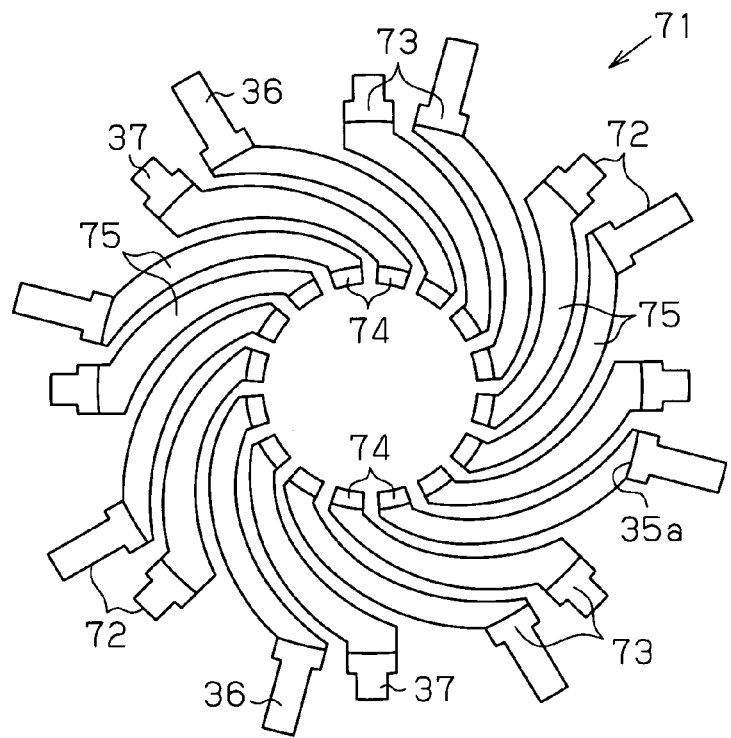
FIG. 10A is a plan view of a first short-circuit member group included in the commutator shown in FIG. 9.

As shown in FIG. 10A, the first short-circuit member group 71 includes sixteen first short-circuit pieces 72, which are arranged in the circumferential direction of a rotation shaft 11. Each first short-circuit piece 72 has a radially outward end that defines a first outer terminal 73, which functions as a first terminal. The first outer terminal 73 is a generally square, plate-like member. Each of the first short-circuit piece 72 has a radial inward end that defines a first inner terminal 74, which functions as a second terminal. The first inner terminal 74 is a generally square, plate-like member. Each first short-circuit piece 72 includes a connecting portion, between the first outer terminal 73 and the first inner terminal 74. The first connecting portion 75 is a band-like member.

As shown in FIG. 9, the width of each first outer terminal 73 in the circumferential direction is smaller than the width of each segment 24 in the circumferential direction. The first inner terminal 74, which is a generally square, plate-like member, is larger than the first inner terminal 34 of the first embodiment. Each first connecting portion 75 extends along an involute curve. More specifically, the first connecting portion 75 is inclined with respect to a straight line extending in the radial direction. As a result, the first outer terminal 73 of each first short-circuit piece 72 is separated from the position of the first inner terminal 74 by a predetermined angle toward one side in the circumferential direction. In the present embodiment, the first connecting portion 75 of each first short-circuit piece 72 connects a first outer terminal 73 to a first inner terminal 74 that is separated from that first outer terminal 73 by an angle of 60 degrees in the clockwise direction as viewed in FIG. 10A. The first connecting portion 75 is wider than the first connecting portion 35 of the first embodiment. The first connecting portions 75 are arranged at substantially equal intervals in the circumferential direction. The first outer terminals 73 of eight of the sixteen first short-circuit pieces 72, each include a first engagement portion 36, which projects outward in the radial direction. The first engagement portion 36 is formed integrally with the first outer terminal 73. The remaining eight first short-circuit pieces 72 each include a first connecting portion 37, which projects outward in the radial direction. The first connecting portion 37 is formed integrally with the first outer terminal 73.

Among the sixteen first short-circuit pieces 72 with the above-described structure, the first short-circuit pieces 72 including the first engagement portions 36 and the first short-circuit pieces 72 including the first connecting portions 37 are arranged alternately in the circumferential direction. In detail, the eight first short-circuit pieces 72 including the first engagement portions 36 are arranged at equal angular intervals (at intervals of 45 degrees in the present embodiment) in the circumferential direction. Each first short-circuit piece 72 including the first engagement portion 36 is arranged between two adjacent ones of the first short-circuit pieces 72 including the first connecting portions 37 in the circumferential direction. Further, the sixteen first inner terminals 74 are arranged at equal angular intervals (at intervals of 45 degrees in the present embodiment) in the circumferential direction. Gaps are formed between the first outer terminals 73 including the first engagement portions 36 and the first outer terminals 73 including the first connecting portions 37 that are adjacent to the first outer terminal 73 including the first engagement portions 36 in the clockwise direction. The gap between the two adjacent first outer terminals 73 is large enough to permit arrangement of a single first outer terminal 73.

Figure 10B:
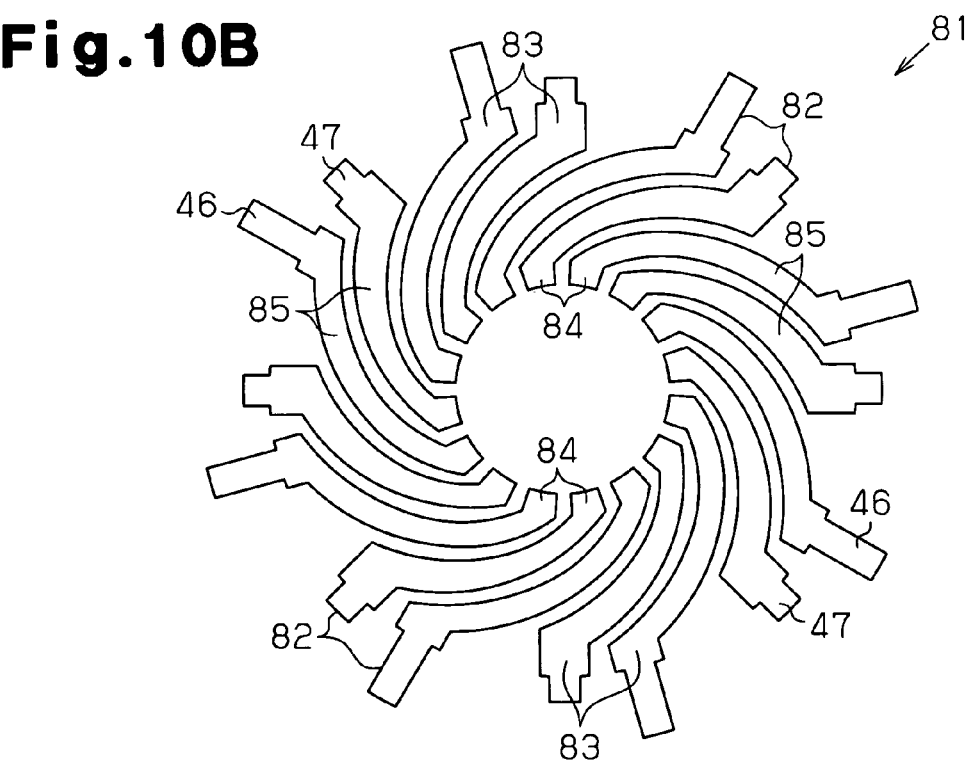
FIG. 10B is a plan view of a second short-circuit member group included in the commutator shown in FIG. 9.

As shown in FIG. 10B, the second short-circuit member group 81 has the same shape as the first short-circuit member group 71. The second short-circuit member group 81 is reverse to the first short-circuit member group 71 shown in FIG. 10A. Thus, the second short-circuit pieces 82 included in the second short-circuit member group 81 are identical to the first short-circuit pieces 72 included in the first short-circuit member group 71. More specifically, each second short-circuit piece 82 includes a second outer terminal 83, which functions as a first terminal, a second inner terminal 84, which functions as a second terminal, and a second connecting portion 85, which functions as a connecting portion. The second outer terminal 83 has the same shape as the first outer terminal 73 of the first short-circuit piece 72. The second inner terminal 74 has the same shape as the first inner terminal 74 of the first short-circuit piece 72. The second connecting portion 85 has the same shape as the first connecting portion 75 of the first short-circuit piece 72. As shown in FIG. 10B, the second connecting portion 85 of each second short-circuit piece 82 connects second outer terminals 83 that are separated from each other by an angle of 60 degrees in the counterclockwise direction in FIG. 10B. Eight of the sixteen second short-circuit pieces 82 each have a second engagement portion 46, which projects outward in the radial direction. The second engagement portion 46 is formed integrally with the second outer terminal 83 of the second short-circuit piece 82. Among the sixteen second short-circuit pieces 82, every second one of the second short-circuit pieces 82 arranged in the circumferential direction includes the second engagement portion 46. The other eight second-short circuit pieces 82 each include a second connecting portion 47, which projects outward in the radial direction. The second connecting portion 47 is formed integrally with the second outer terminal 83. The second engagement portion 46 has the same shape as the first engagement portion 36 of the first short-circuit piece 72 included in the first short-circuit member group 71. The second connecting portion 47 has the same shape as the first connecting portion 37 of the first short-circuit piece 32 included in the first short-circuit member group 81. In the same manner as the first short-circuit pieces 72, the sixteen second short-circuit pieces 82 are arranged in a manner that the second short-circuit pieces 82 including the second engagement portions 46 and the second short-circuit pieces 82 including the second connecting portions 47 are arranged alternately in the circumferential direction.

As shown in FIG. 9, a first spacing recess 35a is formed on one end surface (end surface facing the second short-circuit member group 81) in the thicknesswise direction of the first connecting portion 75 of each first short-circuit piece 72. In the same manner, a second spacing recess 45a is formed on one end surface (end surface facing the first short-circuit member group 71) in the thicknesswise direction of the second connecting portion 85 of each second short-circuit piece 82. The first short-circuit member group 71 and the second short-circuit member group 81 are superimposed with each other in a manner that the first spacing recesses 35a and the second spacing recesses 45a face each other in the plate thicknesswise direction. Further, the first short-circuit member group 71 and the second short-circuit member group 81 are superimposed with each other in a manner that the first engagement portions 36 and the second engagement portions 46 do not come in contact with each other and the first connecting portions 37 and the second connecting portions 47 come in contact with each other. More specifically, the short-circuit member groups 71 and 81 are superimposed with each other in a manner that the eight first outer terminals 73 including the first engagement portions 36 come in contact with the second outer terminals 73 including the second engagement portions 46 and the sixteen first inner terminals 74 come in contact with the sixteen second inner terminals 84. When the first and second short-circuit member groups 71 and 81 superimposed with each other are viewed in the plate thicknesswise direction, a total of twenty four first and second outer terminals 73 and 83, the quantity of which is the same as the segments 24, are arranged at equal angular intervals (at intervals of 15 degrees in the present embodiment) in the circumferential direction.

In a state in which the first short-circuit member group 71 and the second short-circuit member group 81 are superimposed with each other, the first outer terminals 73 and the second outer terminals 83 that are in contact with each other are joined together through welding. The first inner terminals 74 and the second inner terminals 84 that are in contact with each other are joined to each other through welding. The joining is preferably performed through welding, preferably, through TIG welding or spot welding.

Figure 11:
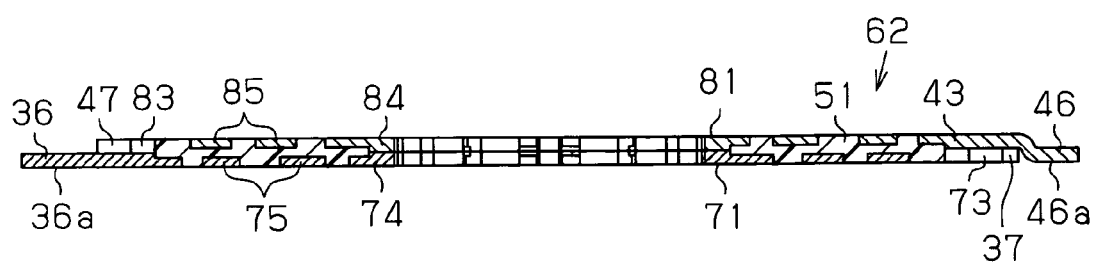
FIG. 11 is a cross-sectional view of a short-circuit member assembly included in the commutator shown in FIG. 9.

As shown in FIG. 11, the second engagement portion 46 has a bent basal end. In detail, the basal end of the second engagement portion 46 is bent toward the first short-circuit member group 71 so that the distal end of the second engagement portion 46 and the distal end of the first engagement portion 36 are located at the same position with respect to a direction parallel to the axial direction of the commutator 61. Thus, a surface 36a of the first engagement portion 36 that is opposite to the second short-circuit member group 81 is flush with a surface 46a of the second engagement portion 46 that is near the first short-circuit member group 71 and outward from the bent portion of the second engagement portion 46.

Figure 12:
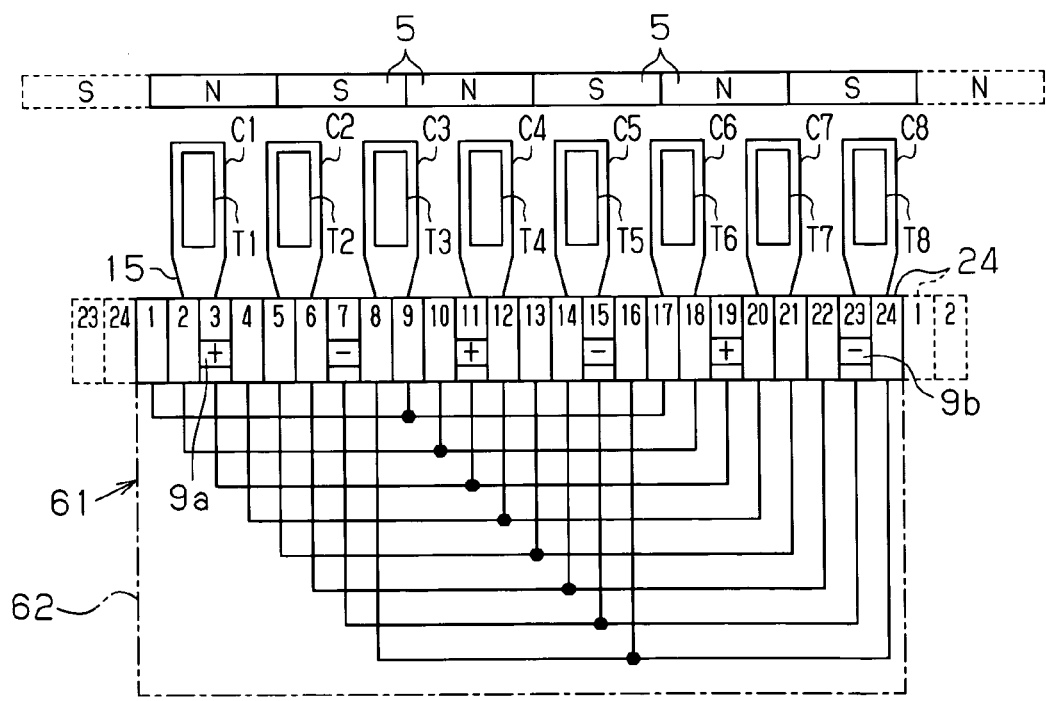
FIG. 12 is a connection wiring diagram of a DC motor according to the second embodiment.

The short-circuit member assembly 62 with the above-described structure is arranged so that the outer surface of the second short-circuit member group 81 comes in contact with the end surfaces 23b of the fixture insulators 23 of the commutator body 21. As shown in FIG. 9, when the short-circuit member assembly 62 is set on the commutator body 21, the basal ends of the first and second engagement portions 36 and 46 and the second connecting portions 47 come in contact with the arrangement surfaces 24a of the segments 24. The first engagement portions 36, the second engagement portions 46, and the first and second connecting portions 37 and 47 that are superimposed with each other come in contact with the positioning pins 24b. The engagement portions 36 and 46 and the connecting portions 37 and 47, which are in contact with the segments 24, are electrically coupled to the segments 24 through welding. As a result, the outer terminals 73 and 83 are electrically coupled to the corresponding segments 24 by the engagement portions 36 and 46 or the connecting portions 37 and 47. Also, the short-circuit member assembly 62 short-circuits the segments 24 arranged at intervals of 120 degrees in the circumferential direction so that they have the same potential. As shown in FIG. 12, in the same manner as in the first embodiment, the short-circuit member assembly 62 short-circuits the segments 24 denoted as segment numbers 1, 9, and 27 to have the same potential, short-circuits the segments 24 denoted as segment numbers 2, 10, and 18 to have the same potential, and short-circuits the segments 24 denoted as segment numbers 3, 11, and 19 to have the same potential. The short-circuit member assembly 62 also short-circuits the segments denoted as segment numbers 4, 12, and 20 to have the same potential, short-circuits the segments 24 denoted as segment numbers 5, 13, and 21 to have the same potential, and short-circuits the segments denoted as segment numbers 6, 14, and 22 to have the same potential. Further, the short-circuit member assembly 62 short-circuits the segments 24 denoted as segment numbers 7, 15, and 23 to have the same potential, and short-circuits the segments 24 denoted as segment numbers 8, 16, and 24 to have the same potential. FIG. 12 shows, in a simplified manner, the wire 15 that is wound around each of the teeth T1 to T8 in a plurality of windings.

As shown in FIG. 9, the number n of segments 24 of each set that are short-circuited to have the same potential is 3. Thus, two first short-circuit pieces 82 included in the first short-circuit member group 71 are used to short-circuit the three segments 24. In the same manner, two second short-circuit pieces 82 included in the second short-circuit member group 81 are used to short-circuit the three segments 24. Further, the commutator 61 includes twenty four segments 24. Thus, the number m of sets of segments 24 that are short-circuited to have the same potential by the short-circuit member assembly 62 is 8. Accordingly, the number of first short-circuit pieces 72 included in the first short-circuit member group 71 is 16, which is calculated by multiplying 2, which corresponds to (n−1), by 8, which corresponds to the number m of segments. In the same manner, the number of the second short-circuit pieces 82 included in the second short-circuit member group 81 is 16, which is calculated by multiplying 2 by 8.

In the short-circuit member assembly 62, the two first short-circuit pieces 72 and the two second short-circuit pieces 82, which short-circuit three segments 24 to have the same potential, are arranged alternately in the circumferential direction. Further, the first short-circuit pieces 72 and the second short-circuit pieces 82 are connected in series in a manner that the inner terminals 74 and 84 are joined to each other at more positions than the outer terminals 73 and 83. In detail, in the total of four short-circuit pieces 72 and 82, which short-circuit the three segments 24 to have the same potential, the first inner terminals 34 of the first short-circuit pieces 72 including the first engagement portions 36 are joined to the second inner terminals 84 of the second short-circuit pieces 82 including the second connecting portions 47. Further, the second outer terminals 83 of the second short-circuit pieces 82 including the second connecting portions 47 are joined to the first outer terminals 73 of the first short-circuit pieces 72 including the first connecting portions 37. Moreover, the first inner terminals 74 of the first short-circuit pieces 72 including the first connecting portions 37 are joined to the second inner terminals 84 of the second short-circuit pieces 82 including the second engagement portions 46. The total of four short-circuit pieces 72 and 82 that are joined in series are arranged in a generally V-shaped form. Only the two outer terminals 73 and 83 arranged at the two ends of the short-circuit pieces 72 and 82 include the engagement portions 36 and 46. The short-circuit member assembly 62 includes a total of eight sets of four short-circuit pieces 72 and 82 that are joined in series. The sets of four short-circuit pieces 32 and 42 are arranged in generally V-shaped forms that are identical. The four short-circuit pieces 32 and 42 in each set are arranged at equal angular intervals in the circumferential direction (portions of the short-circuit pieces 72 and 82 corresponding to the vertexes of the V-shape are arranged at equal angular intervals in the circumferential direction).

The distal ends of the coils C1 to C8 are connected to the commutator 61 with the above-described structure. The distal ends of the coils C1 to C8 are electrically coupled to the engagement portions 36 and 46 through laser welding One distal end of the coil C1 is connected to the first engagement portion 36 that is connected to the segment 24 denoted as segment number 2, and the other distal end of the coil C1 is connected to the second engagement portion 46 that is connected to the segment 24 denoted as segment number 3. In the same manner, one distal end of the coil C2 is connected to the first engagement portion 36 that is connected to the segment 24 denoted as segment number 5, and the other distal end of the coil C2 is connected to the second engagement portion 46 that is connected to the segment 24 denoted as segment number 6. One distal end of the coil C3 is connected to the first engagement portion 36 that is connected to the segment 24 denoted as segment number 8, and the other distal end of the coil C3 is connected to the second engagement portion 46 that is connected to the segment 24 denoted as segment number 9. In the same manner, one distal end of the coil C4 is connected to the first engagement portion 36 that is connected to the segment 24 denoted as segment number 11, and the other distal end of the coil C4 is connected to the second engagement portion 46 that is connected to the segment 24 denoted as segment number 12. One distal end of the coil C5 is connected to the first engagement portion 36 that is connected to the segment 24 denoted as segment number 14, and the other distal end of the coil C5 is connected to the second engagement portion 46 that is connected to the segment 24 denoted as segment number 15. In the same manner, one distal end of the coil C6 is connected to the first engagement portion 36 that is connected to the segment 24 denoted as segment number 17, and the other distal end of the coil C6 is connected to the second engagement portion 46 that is connected to the segment 24 denoted as segment number 18. One distal end of the coil C7 is connected to the first engagement portion 36 that is connected to the segment 24 denoted as segment number 20, and the other distal end of the coil C7 is connected to the second engagement portion 46 that is connected to the segment 24 denoted as segment number 21. One distal end of the coil C8 is connected to the first engagement portion 36 that is connected to the segment 24 denoted as segment number 23, and the other distal end of the coil C8 is connected to the second engagement portion 46 that is connected to the segment 24 denoted as segment number 24.

Figure 13:
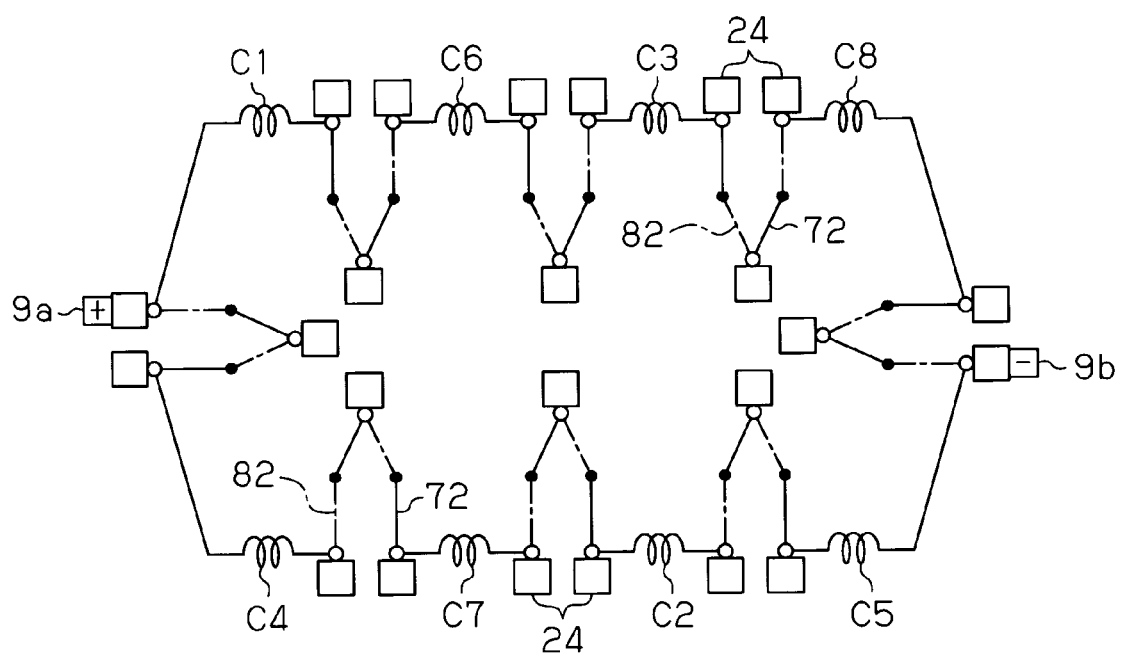
FIG. 13 is a diagram describing the connection between coils in the DC motor according to the second embodiment.

As shown in FIGS. 12 and 13, when the distal ends of predetermined coils C1 to C8 are short-circuited via the short-circuit member assembly 62, the coils C1 to C8 form a parallel circuit via the short-circuit member assembly 62. In FIG. 13, the joint between the first short-circuit piece 72 and the second short-circuit piece 82 are indicated using a black circle, and the joint between the segment 24 and the short-circuit pieces 72 and 82 is indicated using a white circle. For example, when the positive pole brush 9a is in contact with the segment 24 denoted as segment number 3 and the negative pole brush 9b is in contact with the segment 24 denoted as segment number 15, the coils C1, C6, C3, and C8 are connected in series, and the coils C4, C7, C2, and C5 are connected in series. The coils C1, C6, C3, and C8 and the coils C4, C7, C2, and C5 are connected in parallel to the brushes 9a and 9b. In the present embodiment, the distal ends of the coils C1 to C8 are connected to the engagement portions 36 and 46 of the outer terminals 73 and 83, which are at the two ends of the four short-circuit pieces 72 and 82 connecting the three segments 24 in series to set the three segments 24 to the same potential. In this case, current from the positive pole brush 9a and the negative pole brush 9b is either supplied directly from the engagement portions 36 and 46 to the coils C1 to C8 or supplied to each of the coils C1 to C8 via the single first short-circuit piece 72 and the single second short-circuit piece 82, or supplied to each of the coils C1 to C8 via the two first short-circuit pieces 72 and the two second short-circuit pieces 82, or a total of four short-circuit pieces 72 and 82.

The present embodiment has the advantages described below in addition to advantage (1) of the first embodiment.

(3) The four short-circuit pieces 72 and 82, which connect the three segments 24 in series to set the three segments 24 to the same potential, include the engagement portions 36 and 46 for connecting the distal ends of the coils C1 to C8 only to the outer terminals 73 and 83 arranged at the two ends of the four short-circuit pieces 72 and 82. The DC motor 1 of the present embodiment therefore connects the distal ends of the coils C1 to C8 to the engagement portions 36 and 46 so that the distal end of one coil is connected to one engagement portion. This shortens the length of the distal ends of the coils C1 to C8 and simplifies the winding of the distal ends of the coils C1 to C8.

(4) Among the four short-circuit pieces 72 and 82 that connect the three segments 24 in series to set the three segments 24 to the same potential, adjacent ones of the short-circuit piece 72 and the short-circuit piece 82 are arranged in generally V-shaped forms that are identical. The short-circuit pieces 72 and the short-circuit pieces 82 that are arranged in the substantially V-shaped forms are arranged at equal angular intervals in the circumferential direction. Thus, the connecting portions 75 and 85 are longer in the circumferential direction than in a conventional structure. As a result, the connecting portions 75 and 85 have larger cross-sectional areas in the direction orthogonal to the direction in which the current flows through each of the connecting portions 75 and 85. This reduces the electric resistance in the connecting portions 75 and 85.

(5) The engagement portions 36 and 46 are located at the same positions with respect to the axial direction (axial direction of the commutator 61). This minimizes movement of a jig in the axial direction for connecting (welding) the distal ends of the coils C1 to C8 to the engagement portions 36 and 46. As a result, the engagement portions 36 and 46 and the distal ends of the coils C1 to C8 are easily connected to each other.

A third embodiment of the present invention will now be described with reference to the drawings focusing on differences from the above embodiments.

Figure 14:
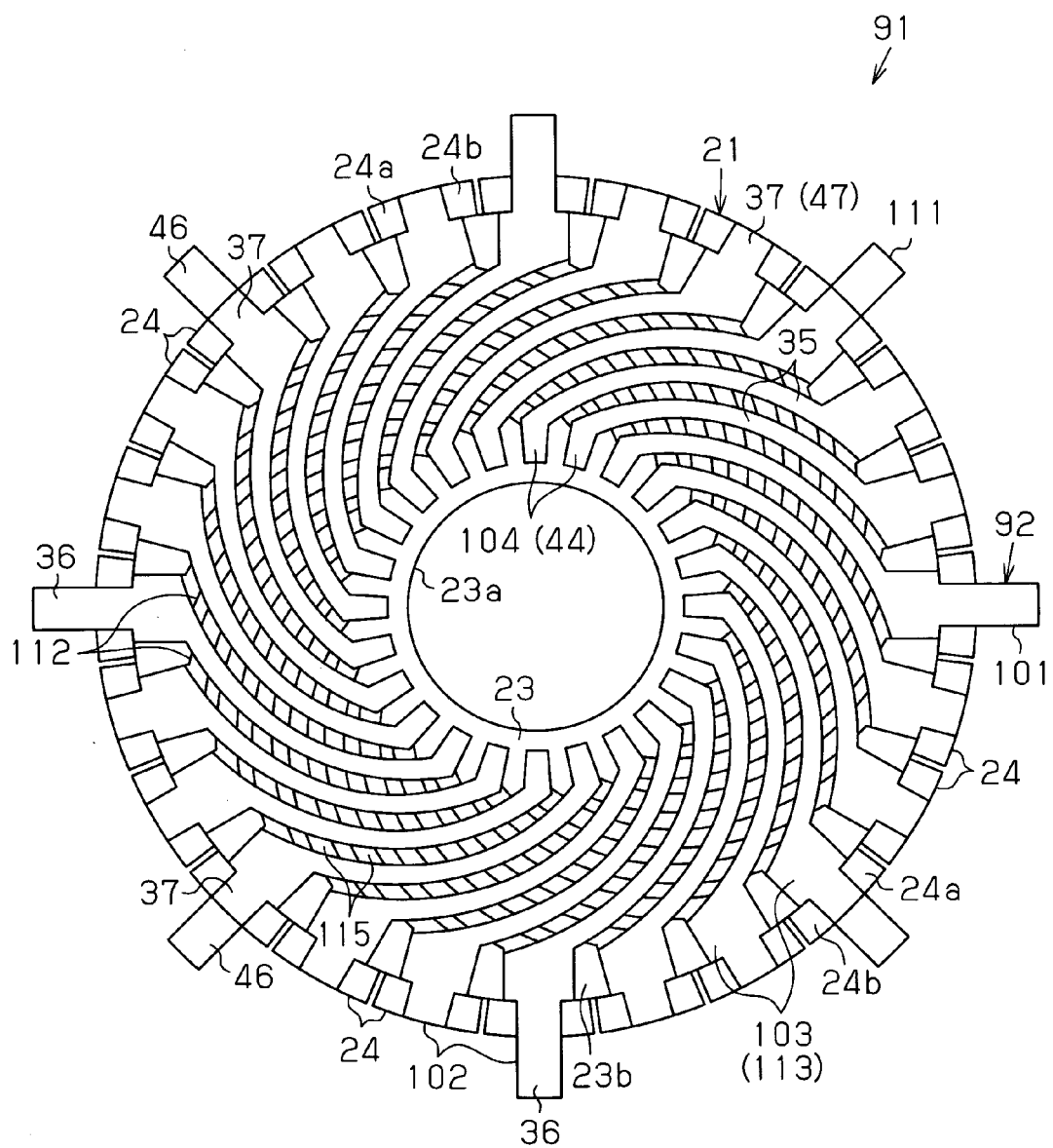
FIG. 14 is a bottom view of a commutator according to a third embodiment of the present invention.

As shown in FIG. 14, a commutator 91 according to the present embodiment includes a commutator body 21 and a short-circuit member assembly 92. The short-circuit member assembly 92 is fixed to the commutator body 21. The short-circuit member assembly 92 includes a first short-circuit member group 101 and a second short-circuit member group 111, which are arranged to sandwich an insulation portion 51. FIG. 14 does not show the insulation portion 51.

Figure 15A:
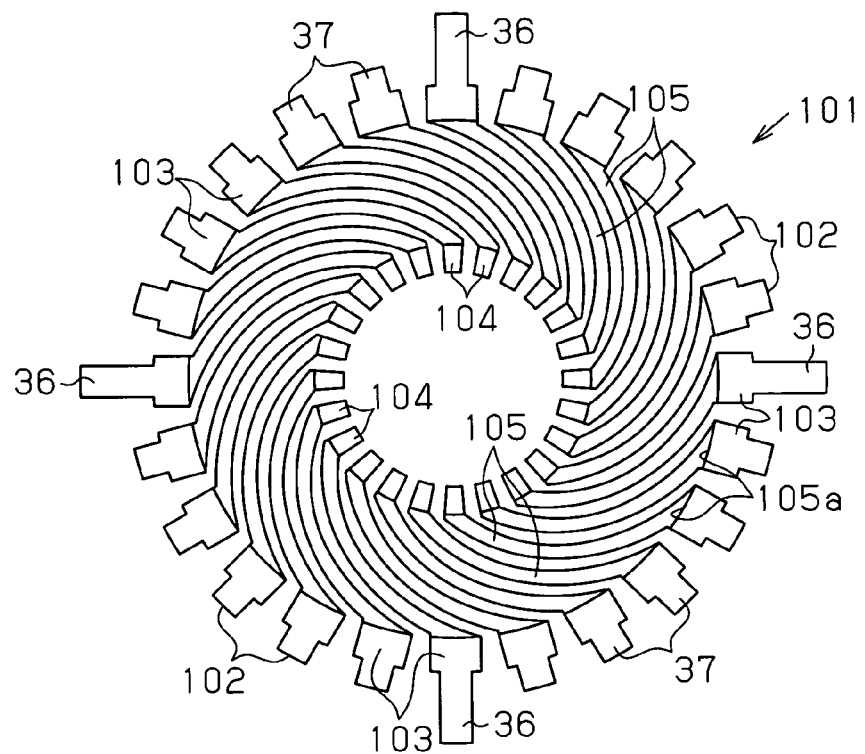
FIG. 15A is a plan view of a first short-circuit member group included in the commutator shown in FIG. 14.

As shown in FIG. 15A, the first short-circuit member group 101 includes twenty four first short-circuit pieces 102, which are arranged in the circumferential direction of a rotation shaft 11. Each first short-circuit piece 102 has a radially outward end defining a first outer terminal 103, which functions as a first terminal. Each first short-circuit piece 102 has a radially inward end defining a first inner terminal 104, which functions as a second terminal. Each first short-circuit piece 102 includes a first connecting portion 105, which functions as a connecting portion, between the first outer terminal 103 and the first inner terminal 104. The first connecting portion 105 is a substantially band-like member.

Among the twenty four first short-circuit pieces 102, the first short-circuit terminals 103 of four of the first short-circuit pieces 102 each include a first engagement portion 36, which projects outward in the radial direction. The first engagement portion 36 is formed integrally with the first short-circuit piece 102. Among the twenty four first short-circuit pieces 102, every sixth one of the first short-circuit pieces 102 arranged in the circumferential direction includes the first engagement portion 36. The first engagement portion 36 is a rectangular plate-like member. The width of the first engagement portion 36 in the circumferential direction is smaller than the width of the first outer terminal 103 in the circumferential direction. The length of the first engagement portion 36 in the circumferential direction is smaller than the width of the first outer terminal 103 in the circumferential direction. The length of the first engagement portion 36 in the radial direction is greater than the thickness of the segment 24.

Figure 15B:
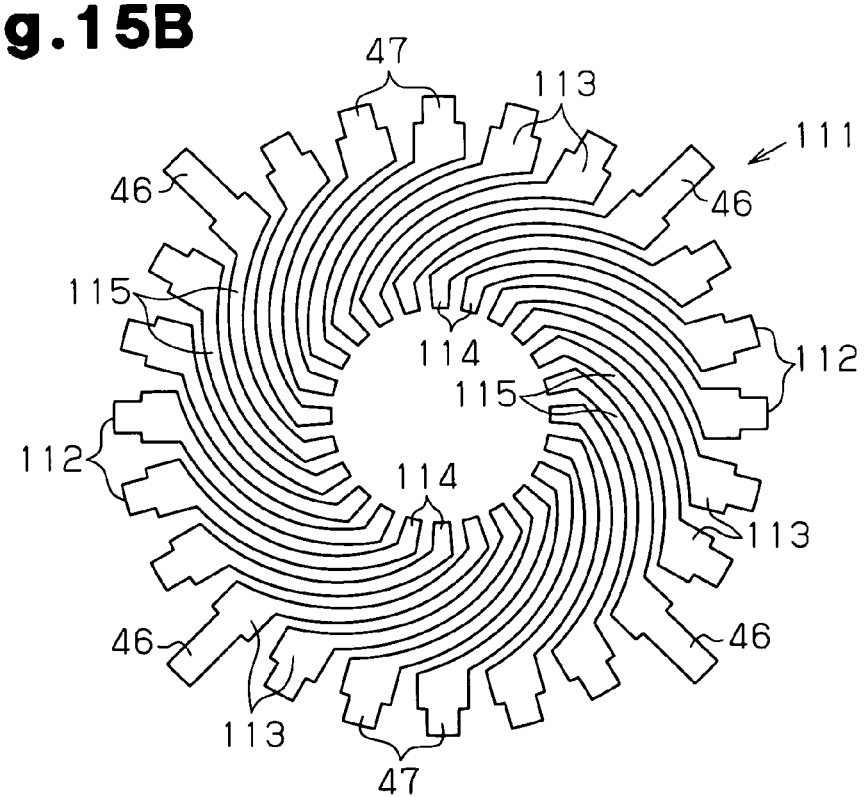
FIG. 15B is a plan view of a second short-circuit member group included in the commutator shown in FIG. 14.

The first outer terminals 103 of the remaining twenty first short-circuit pieces 102 each include a first connecting portion 37, which projects outward in the radial direction. The first connection portion 37 is formed integrally with the first outer terminal 103. The first connecting portion 37 is a square plate-like member. The width of the first connecting portion 37 in the circumferential direction is smaller than the width of the first outer terminal 103 in the circumferential direction. The length of the first connecting portion 37 in the radial direction is smaller than the length of the first engagement portion 36 in the radial direction. As shown in FIG. 15B, the second short-circuit member group 111 is reverse to the first short-circuit member group 101 shown in FIG. 15A. The second short-circuit member group 111 includes twenty four second short-circuit pieces 112 that are arranged in the circumferential direction of the rotation shaft 11. Each second short-circuit piece 112 has a radially outward end defining a second outer terminal 113, which functions as a first terminal. Each second short-circuit piece 112 has a radially inward end defining a second inner terminal 114, which functions as a second terminal. Each second short-circuit piece 112 has a second connecting portion 115, which functions as a connecting portion, between the second outer terminal 113 and the second inner terminal 114. The second connecting portion 115 is a belt-like member. Among the twenty four second short-circuit pieces 112, the second outer terminals 113 of four second short-circuit pieces 112 each include a second engagement portions 46, which projects outward in the radial direction. The second engagement portion 46 is formed integrally with the second outer terminal 113. The second engagement portion 46 has the same shape as the first engagement portion 36. Among the twenty four second short-circuit pieces 112, every sixth one of the second short-circuit pieces 112 includes the second engagement portion 46. The second outer terminals 113 of the other twenty second short-circuit pieces 42 each include a second connecting portion 47, which projects outward in the radial direction. The second connecting portion 47 is formed integrally with the second outer terminal 113. The second connecting portion 47 has the same shape as the first connecting portion 37.

As shown in FIG. 15A, a first spacing recess 105a is formed on one end surface (end surface facing the second short-circuit member group 111) in the thicknesswise direction of each first connecting portion 105. In the same manner, a second spacing recess 115a is formed on one end surface (end surface facing the first short-circuit member group 101) in the thicknesswise direction of each second connecting portion 115. The first short-circuit member group 101 and the second short-circuit member group 111 are superimposed with each other so that the first spacing recesses 105a and the second spacing recesses 115a face each other in the plate thicknesswise direction. Also, the first short-circuit member group 101 and the second short-circuit member group 111 are superimposed with each other so that the first engagement portions 36 and the second engagement portions 46 do not come in contact with each other and the first connecting portions 37 and the second connecting portions 47 come in contact with each other. More specifically, the short-circuit member groups 101 and 111 are superimposed with each other in a manner that the twenty four first outer terminals 103 come in contact with the twenty four second outer terminals 113 and the twenty four first inner terminals 104 come in contact with the twenty four second inner terminals 114. When the first and second short-circuit member groups 101 and 111 superimposed with each other are viewed in the plate thicknesswise direction, the twenty four first and second outer terminals 103 and 113, the quantity of which is the same as the segments 24, are arranged at equal angular intervals (at intervals of 15 degrees in the present embodiment) in the circumferential direction.

As shown in FIG. 14, the first short-circuit piece 112 including the second engagement portion 46 is arranged between the two first short-circuit pieces 102 including the first engagement portions 36 that are adjacent to each other in the circumferential direction. Further, when the first short-circuit member group 101 and the second short-circuit member group 111 are superimposed with each other, a total of eight engagement portions 36 and 46 are arranged at equal angular intervals (at intervals of 45 degrees in the present embodiment) in the circumferential direction.

Further, when the first short-circuit member group 101 and the second short-circuit member group 111 are superimposed with each other, the first connecting portions 105 and the second connecting portions 115 extend in directions opposite to each other from the first outer terminals 103 and the second outer terminals 113, which are superimposed with each other. Further, the first spacing recesses 105a and the second spacing recesses 115a of the first connecting portions 105 and the second connecting portions 115 prevent the first connecting portions 105 and the second connecting portions 115 from coming in contact with each other in the superimposing direction. The first outer terminals 103 and the second outer terminals 113 that are in contact with each other are joined to each other through welding, whereas the first inner terminals 104 and the second inner terminals 114 that are in contact with each other are joined to each other through welding.

Figures 16A, 16B:
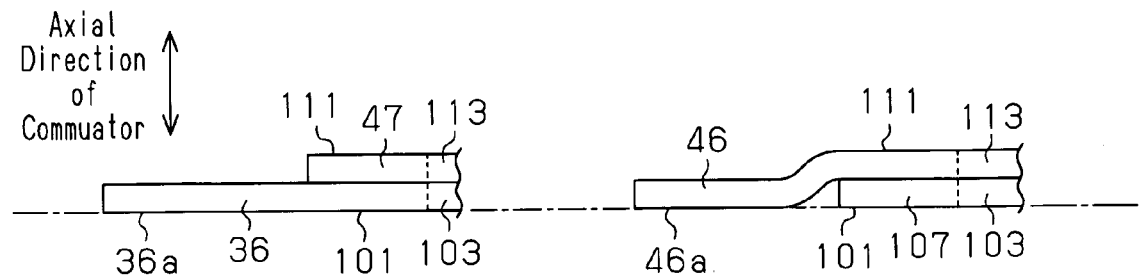
FIG. 16A is a side view of a first engagement portion according to the third embodiment.
FIG. 16B is a side view of a second engagement portion according to the third embodiment.
Figure 17:
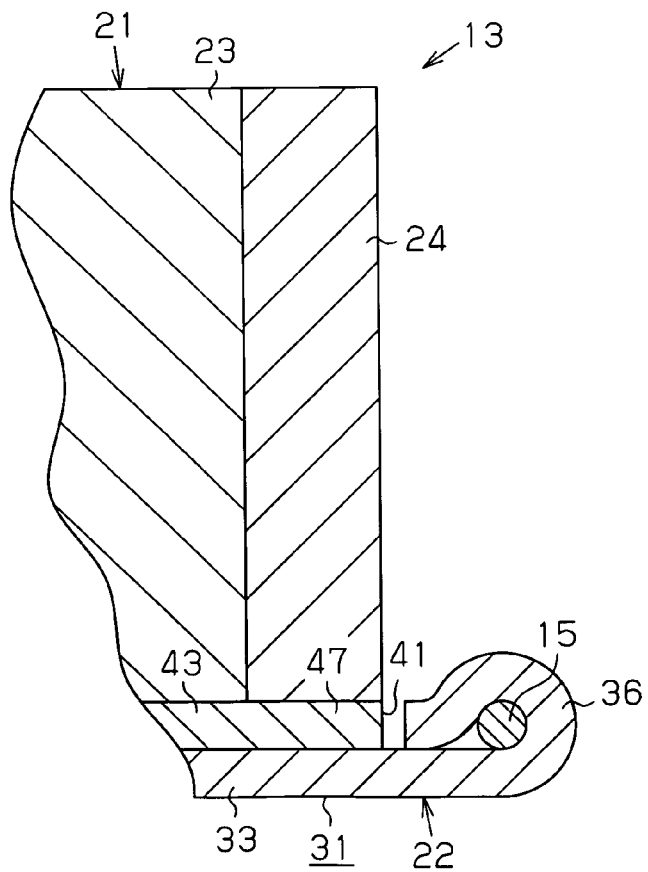
FIG. 17 is an enlarged partial cross-sectional view of a commutator according to the third embodiment.

Further, as shown in FIGS. 16A and 16B, in a state in which the first short-circuit member group 101 and the second short-circuit member group 111 are superimposed with each other, each second engagement portion 46 has a bent basal end. In detail, the basal end portion of the second engagement portion 46 is bent toward the first short-circuit member group 101 so that the distal end of the second engagement portion 46 and the distal end of the second engagement portion 36 are located at the same position with respect to a direction parallel to the axial direction of the commutator 91. A surface 36a of the first engagement portion 106 that is opposite to the second short-circuit member group 111 is flush with a surface 46a of the first engagement portion 106 that is near the first short-circuit member group 101 and outward from the bent portion of the second engagement portion 46.

The number of the engagement portions 36 and 46 included in the short-circuit member assembly 92 will now be discussed. In the present embodiment, when the total number N of the engagement portions 36 and 46 included in the short-circuit member assembly 92 is an even number (N is a positive integer), the number M of the engagement portions 36 and 46 included in each of the short-circuit member groups 101 and 111 (M is a positive integer) is set as M=N/2. When the number N is an odd number, the number Ma of the engagement portions included in one short-circuit member group (Ma is a positive integer) is set as Ma=(N+1)/2. The number Mb of the engagement portions included in the other short-circuit member group (Mb is a positive integer) is set as Mb=(N−1)/2. As a result, the short-circuit member assembly 92 of the present embodiment includes a total of eight engagement portions 36 and 46, which are used to set the segments 24 arranged at intervals of 120 degrees in the circumferential direction to the same potential. In this case, each of the first short-circuit member group 101 and the second short-circuit member group 111 includes 8/2 engagement portions 36 and 46, that is, four engagement portions 36 and 46.

Figure 18:
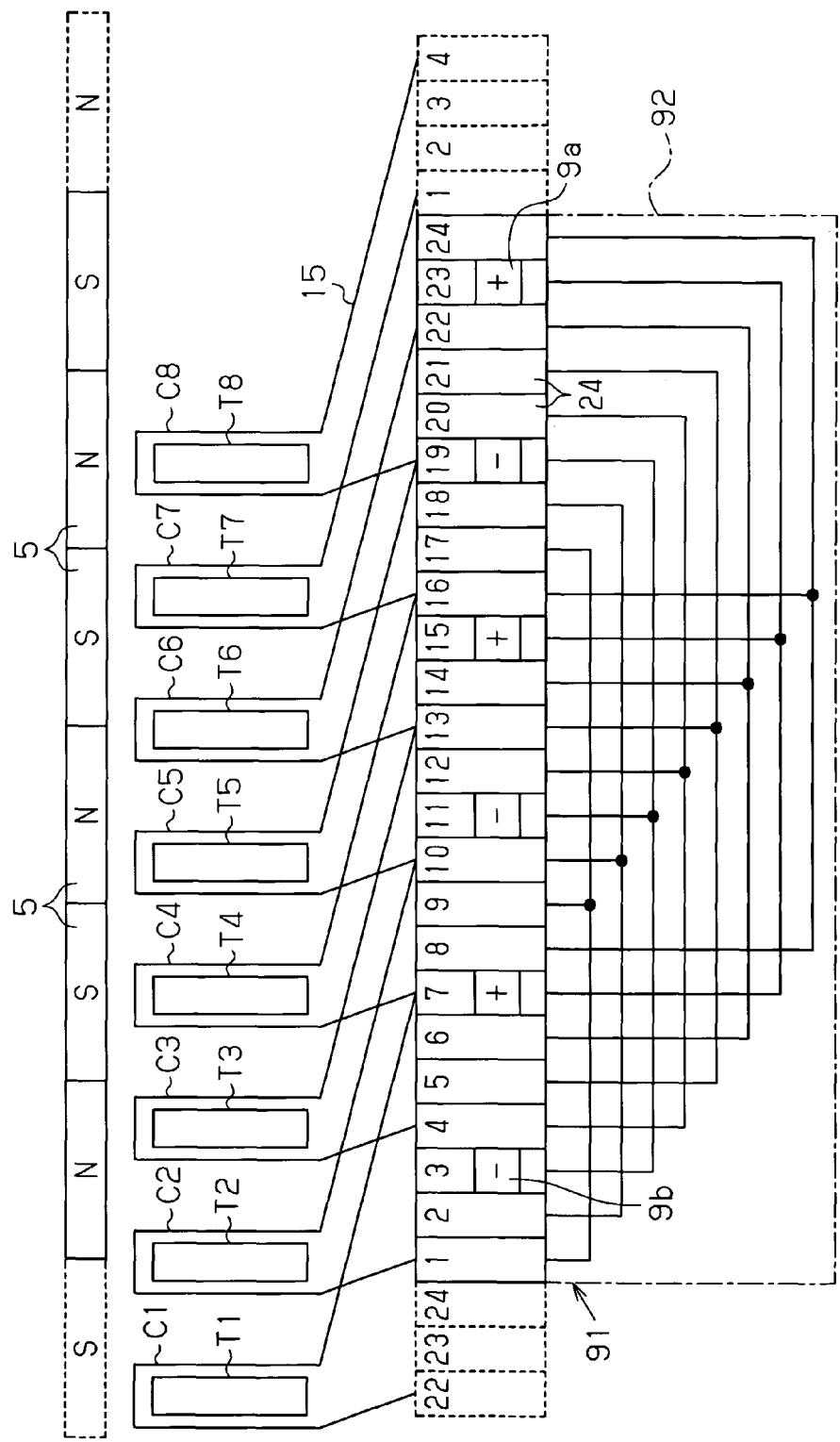
FIG. 18 is a connection wiring diagram of a DC motor according to the third embodiment.

The short-circuit member assembly 92 with the above-described structure is arranged in a manner that the outer surface of the second short-circuit member group 111 comes in contact with the end surfaces 23b of the fixture insulators 23 of the commutator body 21. When the short-circuit member assembly 92 is set on the commutator body 21, the basal ends of the second engagement portions 46 and the second connecting portions 47 come in contact with the arrangement surfaces 24a of the segments 24. The first and second connecting portions 37 and 47 superimposed with each other, the first connecting portions 37 and the second engagement portions 46 superimposed with each other, and the first engagement portions 36 and the second connecting portions 47 superimposed with each other come in contact with the positioning pins 24b. The engagement portions 36 and 46 that are in contact with the segments 24 and the connecting portions 37 and 47 that are in contact with the segments 24 are electrically coupled to the segments 24 through welding. As a result, each first outer terminal 103 is electrically coupled to the corresponding segment 24 via the engagement portions 36 and 46 or the connecting portions 37 and 47. The short-circuit member assembly 92 short-circuits the segments 24 arranged at intervals of 120 degrees in the circumferential direction to have the same potential. As shown in FIG. 18, in the same manner as in the first embodiment, the short-circuit member assembly 92 short-circuits the segments 24 denoted as segment numbers 1, 9, and 17 to have the same potential, short-circuits the segments 24 denoted as segment numbers 2, 10, and 18 to have the same potential, and short-circuits the segments denoted as segment numbers 3, 11, and 19 to have the same potential. The short-circuit member assembly 92 short-circuits the segments 24 denoted as segment numbers 4, 12, and 20 to have the same potential, short-circuits the segments 24 denoted as segment numbers 5, 13, and 21 to have the same potential, and short circuits the segments 24 denoted as segment numbers 6, 14, and 22 to have the same potential. Further, the short-circuit member assembly 92 short-circuits the segments 24 denoted as segment numbers 7, 15, and 23 to have the same potential, and short-circuits the segments 24 denoted as segment numbers 8, 16, and 24 to have the same potential.

The distal ends of the coils C1 to C8 are connected to the commutator 91 with the above-described structure. The ends of the first engagement portions 36 and the second engagement portions 46 that are superimposed with each other and come in contact with each other are bent back toward the basal end portions to hold the distal ends of the corresponding coils C1 to C8. The distal ends of the coils C1 to C8 are electrically coupled to the corresponding engagement portions 36 and 46 through welding. As shown in FIG. 18, one distal end of the coil C1 is connected to the first-engagement portion 36 that is connected to the segment 24 denoted as segment number 22, and the other distal end of the coil C1 is connected to the second engagement portion 46 that is connected to the segment 24 denoted as segment number 7. In the same manner, one distal end of the coil C2 is connected to the second engagement portion 46 that is connected to the segment 24 denoted as segment number 1, and the other distal end of the coil C2 is connected to the first engagement portion 36 that is connected to the segment 24 denoted as segment number 1. One distal end of the coil C3 is connected to the first engagement portion 36 that is connected to the segment 24 denoted as segment number 4, and the other distal end of the coil C3 is connected to the second engagement portion 46 that is connected to the segment 24 denoted as segment number 13. In the same manner, one distal end of the coil C4 is connected to the second engagement portion 46 that is connected to the segment 24 denoted as segment number 7, and the other distal end of the coil C4 is connected to the first engagement portion 36 that is connected to the segment 24 denoted as segment number 16. One distal end of the coil C5 is connected to the first engagement portion 36 that is connected to the segment 24 denoted as segment number 10, and the other distal end of the coil C5 is connected to the second engagement portion 46 that is connected to the segment 24 denoted as segment number 19. One distal end of the coil C6 is connected to the second engagement portion 46 that is connected to the segment 24 denoted as segment number 13, and the other distal end of the coil C6 is connected to the first engagement portion 36 that is connected to the segment 24 denoted as segment number 22. One distal end of the coil C7 is connected to the first engagement portion 36 that is connected to the segment 24 denoted as segment number 16, and the other distal end of the coil C7 is connected to the second engagement portion 46 that is connected to the segment 24 denoted as segment number 1. One distal end of the coil C8 is connected to the second engagement portion 46 that is connected to the segment 24 denoted as segment number 19, and the other distal end of the coil C8 is connected to the first engagement portion 36 that is connected to the segment 24 denoted as segment number 4.

A method for manufacturing the first short-circuit member group 101 and the second short-circuit member group 111 will now be described.

Figure 19:
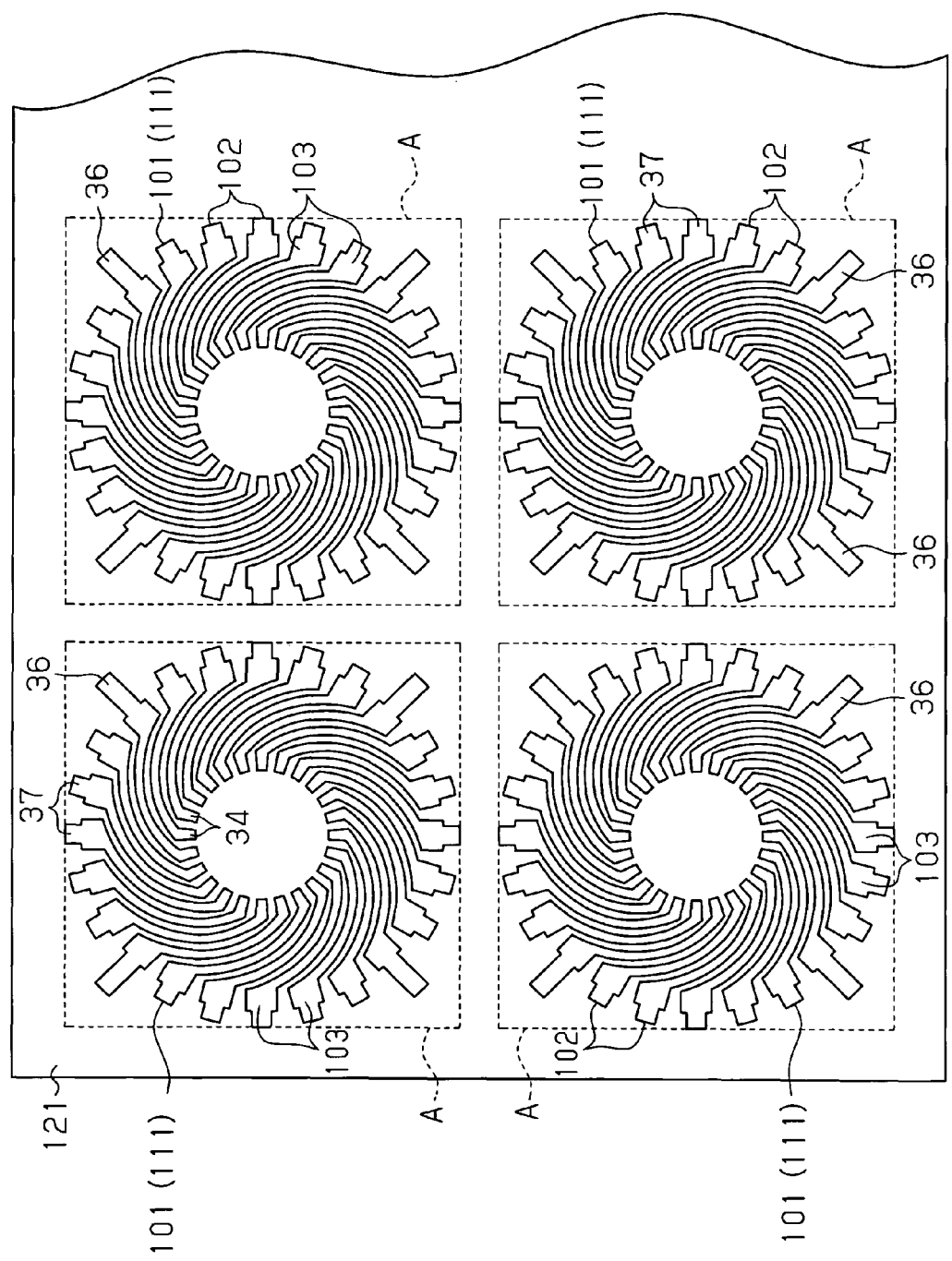
FIG. 19 is a diagram describing the layout of short-circuit member groups cut out from a plate according to the third embodiment.

As shown in FIG. 19, the first short-circuit member group 101 and the second short-circuit member group 111 are punched out of a belt-like conductive plate member 121. The conductive plate member 121 may be, for example, a copper plate. The first short-circuit member group 101 is parallel to a straight line connecting the distal ends of the first engagement portions 36 that are adjacent in the circumferential direction. Further, the first short-circuit member group 101 is arranged within a regular-square area A defined by four straight lines extending through the distal ends of every third one of the connecting portions 37 in the circumferential direction from a first outer terminal 103 that includes the first engagement portion 36. The layout of the first short-circuit member groups 101 on the plate member 121 is determined in a manner that two of the four sides defining each area A that are parallel to each other are parallel to the short-side direction (vertical direction in FIG. 19) of the plate member 121 and the remaining two sides are orthogonal to the short-side direction of the plate member 121. In this case, the centers of the two areas A adjacent in the width direction of the plate member 121 lie along a straight line parallel to the short-side direction of the plate member 121. The centers of the two areas A adjacent in the longitudinal direction of the plate member 121 lie along a straight line orthogonal to the short-side direction of the plate member 121. When the first short-circuit member groups 101 are punched out with such a layout, the plate member 121 is simultaneously pressurized in the plate thicknesswise direction to form the first spacing recesses 105*a* in each first short-circuit member group 101. The second short-circuit member group 111 is formed by reversing the punched out first short-circuit member group 101.

The present embodiment has the advantages described below.

(6) A total of eight engagement portions 36 and 46 included in the short-circuit member assembly 92 are formed at dispersed positions in the short-circuit member groups 101 and 111. As compared with a short-circuit member assembly in which each short-circuit member group includes eight engagement portions, each of the short-circuit member groups 101 and 111 has less engagement portions. This reduces the size of the area A in the plate member 121 for forming the short-circuit member groups 101 and 111, from which the single short-circuit member group 101 (or the single short-circuit member group 111) is punched out. As a result, the yield of the short-circuit member groups 101 and 111, which are formed by punching through press working, increases and consequently increases the yield of the short-circuit member assembly 92. Some of the short-circuit pieces 102 and 112 included in the short-circuit member groups 101 and 111 do not include the engagement portions 36 and 46. This simplifies a portion of a punching die, which is used for pressing, corresponding to the short-circuit pieces 102 and 112 that do not include the engagement portions 36 and 46.

(7) The first short-circuit member group 101 includes the four engagement portions 36, which is half of a total of eight engagement portions 36 and 46, in the short-circuit member assembly 92. In the same manner, the second short-circuit member group 111 includes the four engagement portions 46, which is half of a total of eight engagement portions 36 and 46 in the short-circuit member assembly 92. This drastically improves the yield of both the short-circuit member groups 101 and 111 that are superimposed with each other.

(8) Each of the short-circuit member groups 101 and 111 includes four or less engagement portions 36 and 46. As compared with when each of the short-circuit member groups 101 and 111 includes five or more engagement portions 36 and 46, this structure reduces the size of the area A in the plate member 121 for forming the short-circuit member groups 101 and 111, from which the single short-circuit member group 101 (or the short-circuit member group 111) is punched out. Accordingly, the yield of the short-circuit member groups 101 and 111 is further improved.

(9) The four first engagement portions 36 and the four second engagement portions 46 included in the short-circuit member groups 101 and 111 are arranged at equal angular intervals in the circumferential direction. This further reduces the size of the area A in the plate member 121, from which the single short-circuit member group 101 (or the short-circuit member group 111) is punched out, as compared with when the engagement portions 36 and 46 included in the short-circuit member groups 101 and 111 are not formed at equal angular intervals in the circumferential direction. Accordingly, the yield of the short-circuit member groups 101 and 111 is further improved.

(10) The engagement portions 36 and 46 are located at the same positions with respect to the axial direction (axial direction of the commutator 91). This minimizes movement of a jig in the axial direction for connecting (welding) the distal ends of the coils C1 to C8 to the engagement portions 36 and 46. As a result, the distal ends of the coils C1 to C8 are easily connected to the engagement portions 36 and 46.

(11) The first and second engagement portions 36 and 46 are bent back to prevent the distal ends of the coils C1 to C8 from being separated from the first and second engagement portions 36 and 46. This ensures that the distal ends of the coils C1 to C8 are connected to the first and second engagement portions 36 and 46.

The above embodiments of the present invention may be modified as follows.

The size of the inner terminals 74 and 84 in the second embodiment may be the same as the size of the inner terminals 34 and 44 in the first embodiment. In this case, the inner terminals 74 and 84 that are adjacent in the circumferential direction are arranged at larger intervals. Thus, the inner terminals 74 and 84 are welded (by TIG welding for example) more easily.

In the short-circuit member assembly 22 of the first embodiment, the inner terminals 34 and 44 may be arranged at equal angular intervals in the circumferential direction, and the width of each of the connecting portions 35 and 45 in the circumferential direction may be increased from that of the first embodiment. In such a case, the short-circuit member assembly 22 of the first embodiment would have the above-described advantage (4).

In the first embodiment, the four short-circuit pieces 32 and 42 that connect in series the three short-circuited segments 24 are arranged in generally identical U-shaped forms. The four short-circuit pieces 32 and 42 are also arranged at equal angular intervals in the circumferential direction. However, the present invention is not limited to such a structure. In the second embodiment, the four short-circuit pieces 72 and 82 that connect in series the three short-circuited segments are arranged in generally identical V-shaped forms. The four short-circuit pieces 72 and 82 are arranged at equal angular intervals in the circumferential direction. However, the present invention is not limited to such a structure. For example, in the short-circuit member assembly 22, the four short-circuit pieces 32 and 42 that connect in series the three short-circuited segments 24 may be arranged in a manner that the engagement portions 36 and 46 are arranged at intervals of 15 degrees in the circumferential direction.

In the first embodiment, the engagement portion may be formed on only one of the outer terminals 33 and 43, which are at the two ends of the four short-circuit pieces 32 and 42 that connect in series the three short-circuited segments 24.

Figure 20:
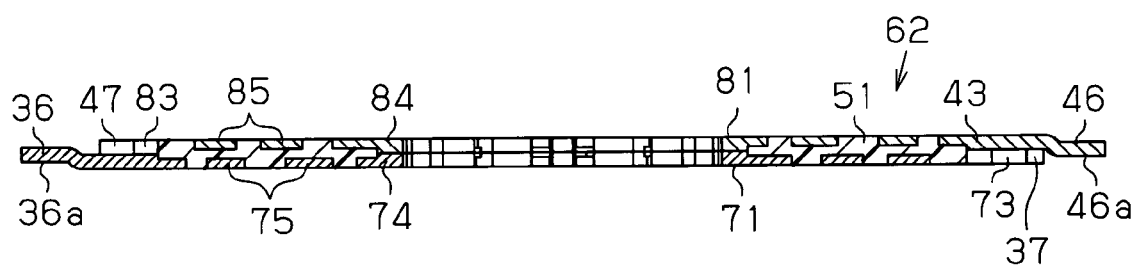
FIG. 20 is a cross-sectional view of a short-circuit member assembly according to another example.

In the second embodiment, the shapes (bent shapes) of the first engagement portions 36 and the second engagement portions 46 are not limited to the described shapes as long as the first engagement portions 36 and the second engagement portions 46 are located the same positions. For example, as shown in FIG. 20, the basal ends of the first engagement portions 36 may be bent toward the second short-circuit member group 81, and the basal ends of the second engagement portions 46 may be bent toward the first short-circuit member group 71. In this case, the surface of the first engagement portion 36 facing the second short-circuit member group 81 and the surface of the first short-circuit member group 71 facing the second engagement portion 46 may be flush with each other at positions corresponding to the middle of the short-circuit members 62 in the thicknesswise direction. Further, for example, the basal ends of the first engagement portions 36 may be bent in a direction in which the basal ends are spaced from the second short-circuit member group 81, and the basal ends of the second engagement portions 46 may be bent toward the first short-circuit member group 71. This may result in the first engagement portions 36 and the second engagement portions 46 being located at the same position with respect to the direction parallel to the axial direction of the commutator 61. This structure also obtains the above-described advantage (5). Alternatively, the first engagement portions 36 and the second engagement portions 46 may be located at different positions with respect to the axial direction.

Figure 21A:
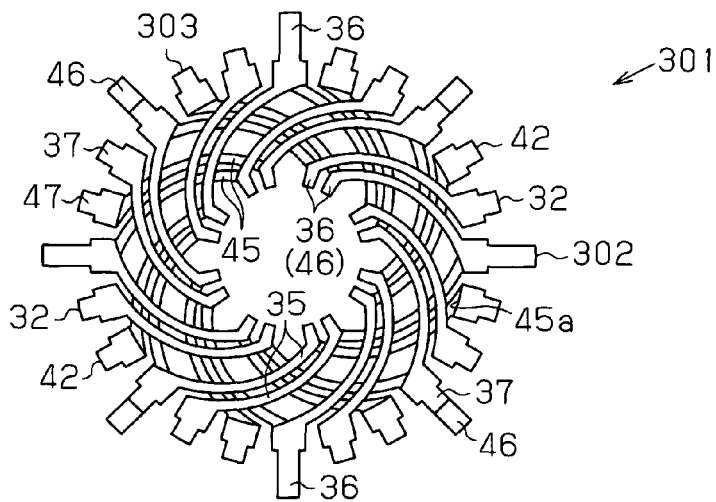
FIGS. 21A to 21C are plan views of a short-circuit member assembly according to another example.
Figure 21B:
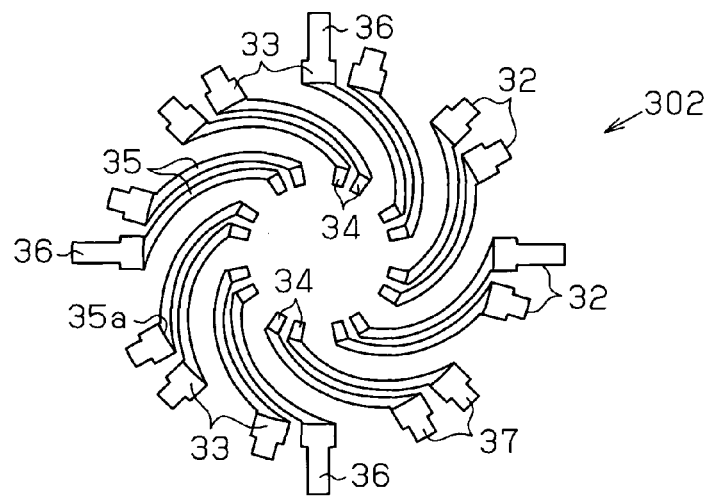
Figure 21C:
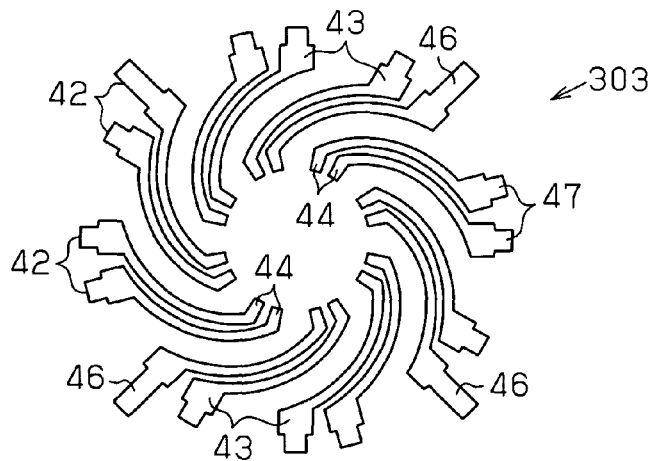
Figure 22:
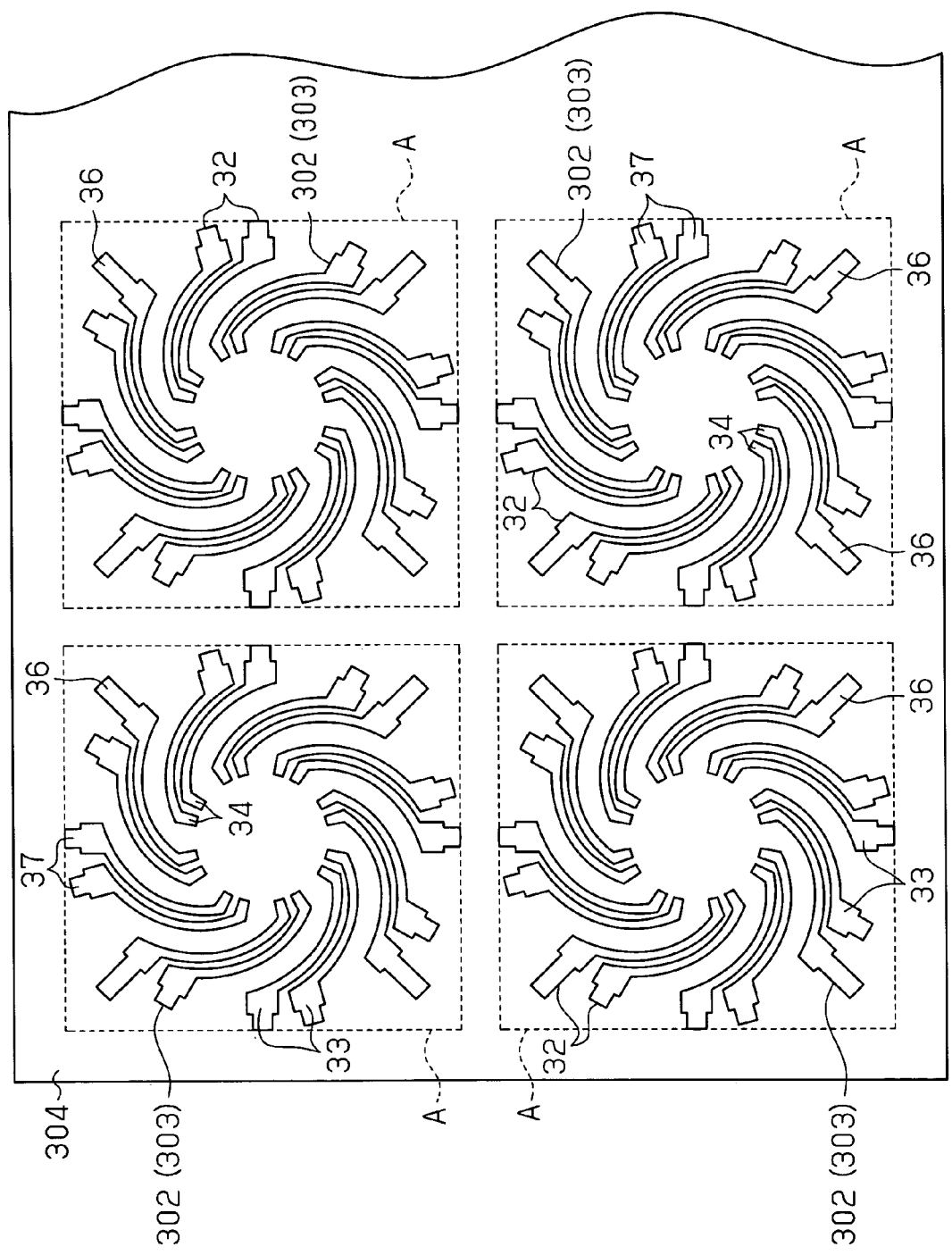
FIG. 22 is a diagram describing the layout of short-circuit member groups that are cut out from a plate according to the other example.

In the first embodiment, the number of the engagement portions 36 included in the first short-circuit member group 31 and the number of the engagement portions 46 included in the second short-circuit member group 41 are not limited in a manner as described above. Each of the first outer terminals 33 may include the first engagement portion 36, and each of the second outer terminals 43 may include the second engagement portion 46. In this case, the distal ends of the coils C1 to C8 are connected only to predetermined ones of the engagement portions 36 and 46. Alternatively, the engagement portions 36 and 46 may be formed at dispersed positions in the short-circuit member groups 31 and 41 that are superimposed with each other. For example, as shown in FIG. 21A, in the same manner as in the short-circuit member assembly 22 in which the first short-circuit member group 31 and the second short-circuit member group 41 are superimposed with each other in the first embodiment, a short-circuit member assembly 301 includes a total of eight engagement portions 36 and 46. In FIGS. 21A to 21C, the components that are the same as those in the first embodiment are given the same reference numerals. As shown in FIG. 21B, in a first short-circuit member group 302 of the short-circuit member assembly 301, every fourth one of the sixteen first short-circuit pieces 32 in the circumferential direction includes a first engagement portion 36. The four first short-circuit pieces 32 including the first engagement portions 36 are arranged at equal angular intervals in the circumferential direction. Further, as shown in FIG. 21C, in a second short-circuit member group 303 of the short-circuit member assembly 301, every fourth one of the sixteen second short-circuit pieces 42 includes a second engagement portion 46. The four second short-circuit pieces 42 including the second engagement portions 46 are arranged at equal angular intervals in the circumferential direction. As shown in FIG. 21A, the first short-circuit member group 302 and the second short-circuit member group 303 are superimposed with each other in a manner that the first engagement portions 36 and the second engagement portions 46 are arranged at equal angular intervals in the circumferential direction without overlapping each other. More specifically, as shown in FIG. 21A, the first engagement portions 36 and the second engagement portions 46 are arranged alternately at intervals of 45 degrees in the circumferential direction. As a result, each of the short-circuit member groups 302 and 303 includes less engagement portions 36 and 46 than the first embodiment. Thus, an area A in a plate member 304 for forming the short-circuit member groups 302 and 303, from which the single short-circuit member group 302 (or the single short-circuit member group 303) is punched out, is a square area as shown in FIG. 22. In this case, the area A is smaller than the area from which each of the short-circuit member groups 31 and 41 is punched out in the first embodiment. This improves the yield of the short-circuit member groups 302 and 303, and consequently improves the yield of the short-circuit member assembly 301. Among the eight engagement portions 36 and 46 included in the short-circuit member assembly 301, the first short-circuit member group 302 includes the four engagement portions 36 and the second short-circuit member group 303 includes the four engagement portions 46. In this case, the first short-circuit member group 302 and the second short-circuit member group 303 are formed with the same yield. The engagement portions 36 and 46 and the distal ends of the coils C1 to C8 may be connected to each other by laser welding or by resistance welding.

The distal ends of the coils C1 to C8 may be connected directly to the segments 24. In this case, the short-circuit member assemblies 22 and 62 do not have to include the engagement portions 36 and 46.

The numbers of the short-circuit pieces 32, 42, 72, and 82 in the short-circuit member groups 31, 41, 71, and 81 is not limited in the manner described above. The number of the short-circuit pieces in each short-circuit member group may be any number that is (n−1) (where n is the number of the segments 24 of each set that are set to the same potential, and n is a positive integer) multiplied by the number m of the sets of segments 24 that are set to the same potential. The number m of the sets of the segments 24 that are set to the same potential is the total number of the segments 24 divided by n.

Each of the coils C1 to C8 may be formed by performing winding, such as distributed winding, with the wire 15.

Figure 23:
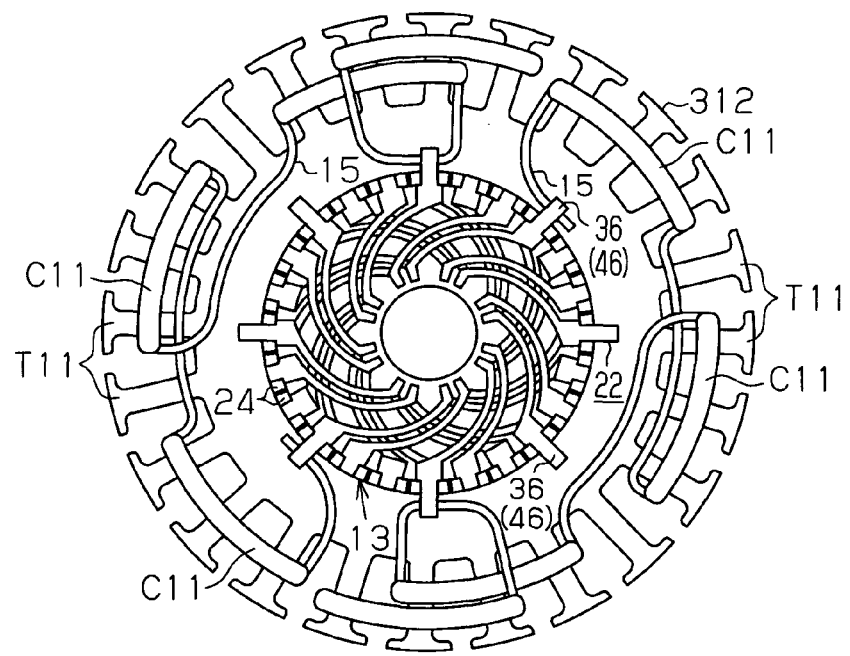
FIG. 23 is a diagram describing how coils are wound around teeth of a DC motor according to the other example.
Figure 24:
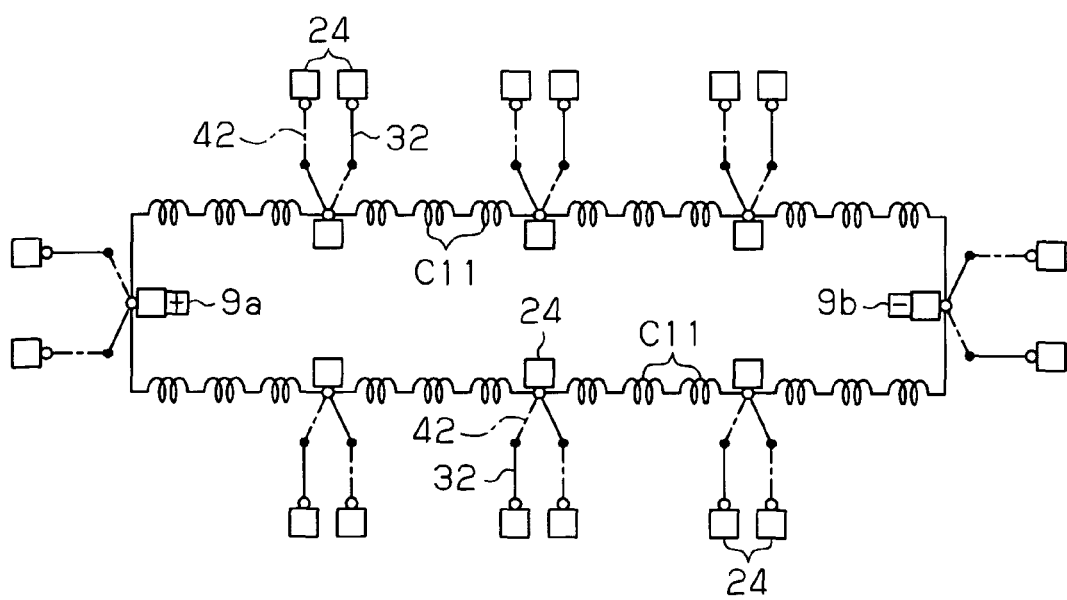
FIG. 24 is a diagram describing the connection between coils included in the DC motor according to the other example.

For example, as shown in FIG. 23, a wire 15 may be wound by performing distributed winding around twenty four teeth T11, which extend radially outward from an armature core 312. The wire 15 engaged with upper-right engagement portions 36 and 46 of a commutator 13 as viewed in FIG. 23 is wound in the forward direction in a plurality of windings to form a coil C11 around the tooth T11 facing toward the engagement portions 36 and 46 in the radial direction and the teeth T11 located on its opposite sides. Then, the wire 15 skips the next single tooth T11 in the clockwise direction and is wound in the reverse direction (direction reverse to the forward direction) around three teeth T11 that are arranged next to one another in the circumferential direction in a plurality of windings to form a coil C11. Further, the wire 15 skips the next single tooth T11 in the clockwise direction and is wound in the forward direction around three teeth T11 that are arranged in the circumferential direction in a plurality of windings to form a coil C11. The wire 15 is then engaged with engagement portions 36 and 46 arranged below the plane of FIG. 23. The wire 15 is wound around each set of three teeth T11 that are arranged next to one another in the manner described above to form twenty four coils C11. FIG. 24 shows only eight of the twenty four coils C11. The twenty four coils C11 form a parallel circuit as shown in FIG. 24.

Figure 25A:
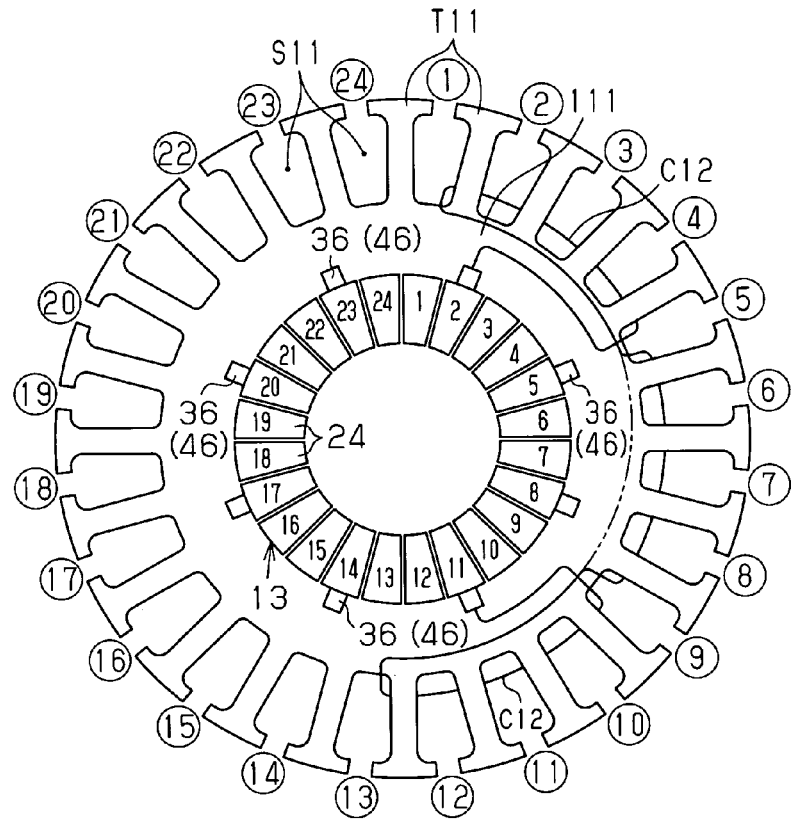
FIGS. 25A and 25B are diagrams describing how coils are wound around teeth of a DC motor according to another example.
Figure 25B:
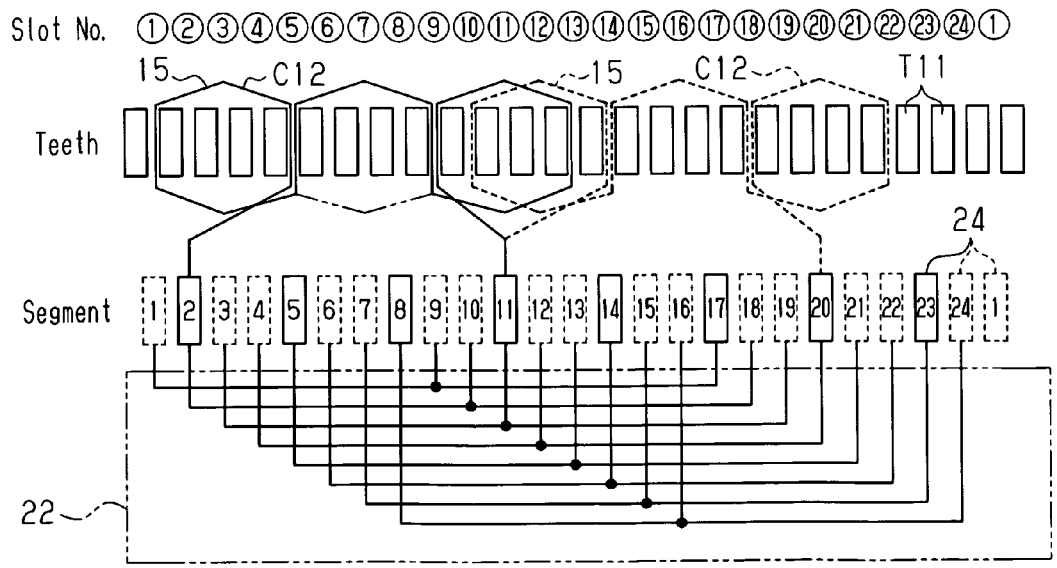

For example, a wire 15 may be wound around twenty four teeth T11 by performing distributed winding in the manner shown in FIGS. 25A and 25B. The wire 15 is wound around four teeth T11 arranged next to one another in the circumferential direction to form a coil C12. The wire 15 engaged with engagement portions 36 and 46 facing toward a slot S11 denoted as slot number 2 in the radial direction is wound in a plurality of windings around the four teeth T11 arranged between a slot S11 denoted as slot number 1 and a slot S11 denoted as slot number 5 to form a coil C12, and is then wound in a plurality of windings around the four teeth T11 arranged between the slot S11 denoted as slot number 5 and a slot S11 denoted as slot number 9 to form a coil C12. Further, the wire 15 is wound in a plurality of windings around the four teeth T11 arranged between the slot S11 denoted as slot number 9 and a slot S11 denoted as slot number 13 to form a coil S12, and is then engaged with engagement portions 36 and 46 facing a slot S11 denoted as slot number 11 in the radial direction. In the same manner, the wire 15 is wound around the other four teeth T11 arranged adjacent to one another in the circumferential direction. FIGS. 25A and 25B show the wire 15 wound around the teeth T11 in a plurality of windings in a simplified manner.

Figure 26:
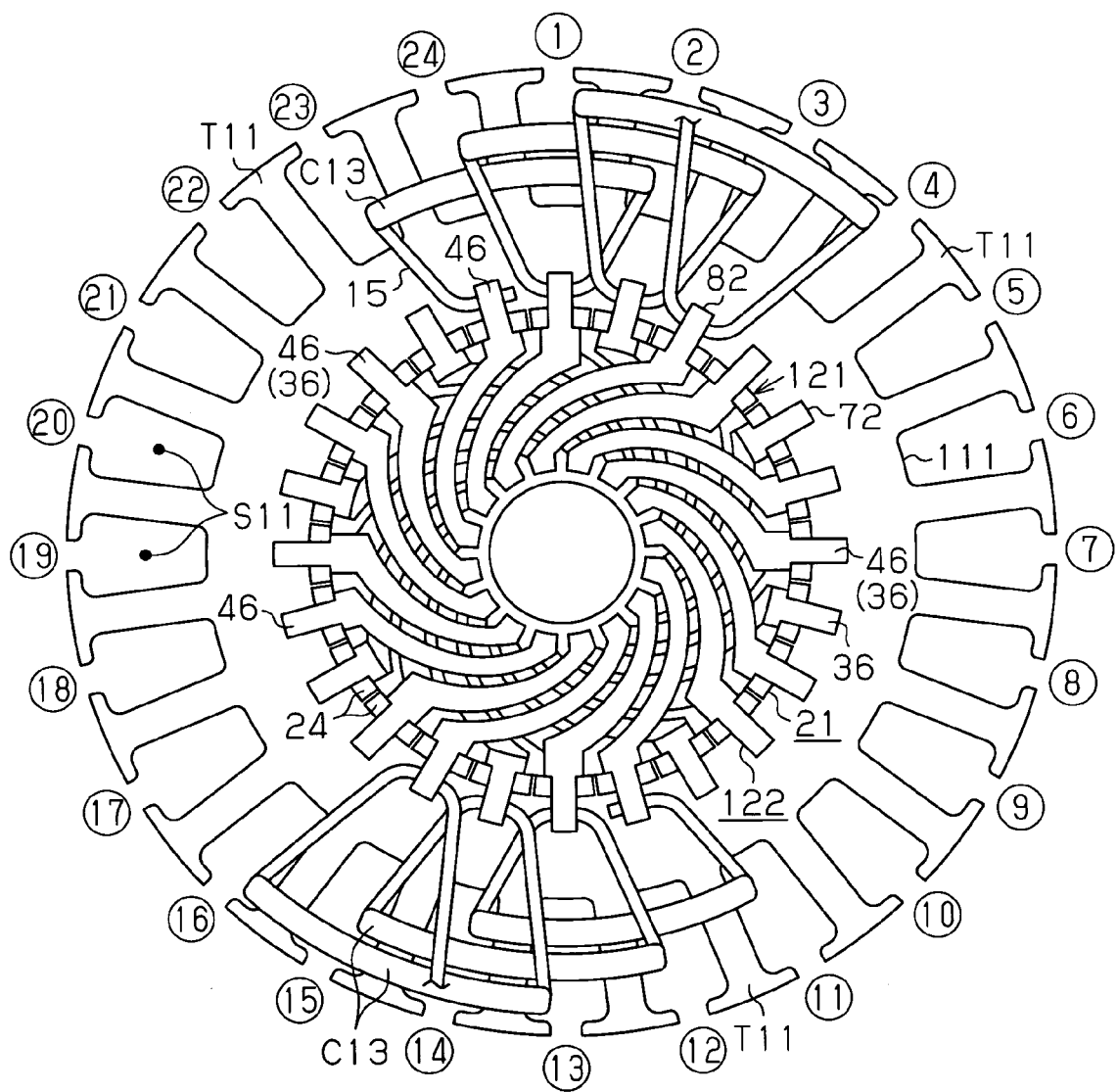
FIG. 26 is a diagram describing how coils are wound around teeth of a DC motor according to another example.
Figure 27:
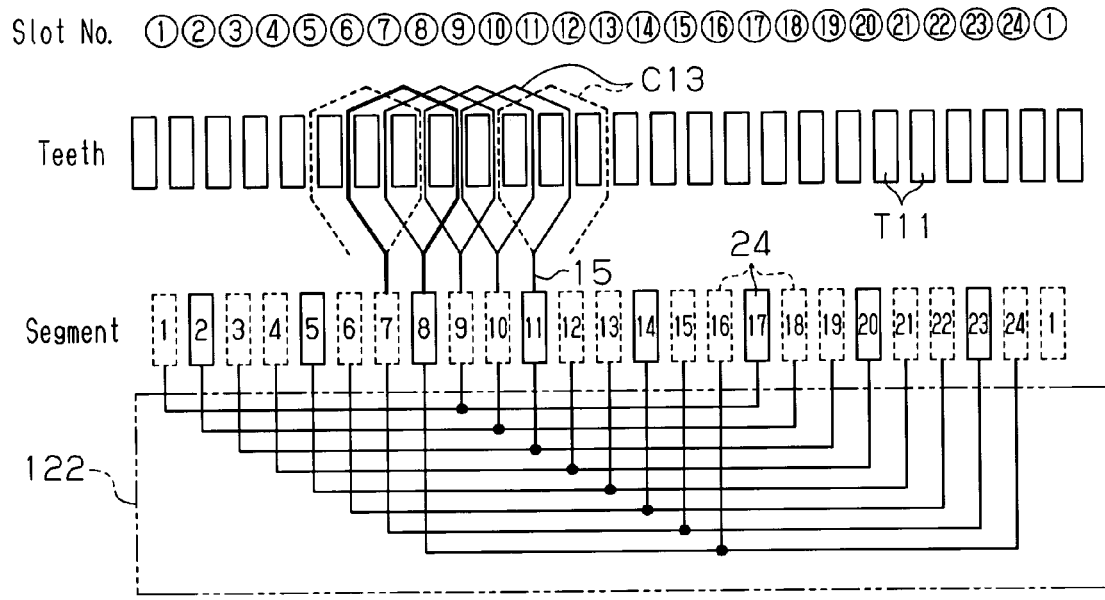
FIG. 27 is a connection wiring diagram of the DC motor according to the other example.
Figure 28:
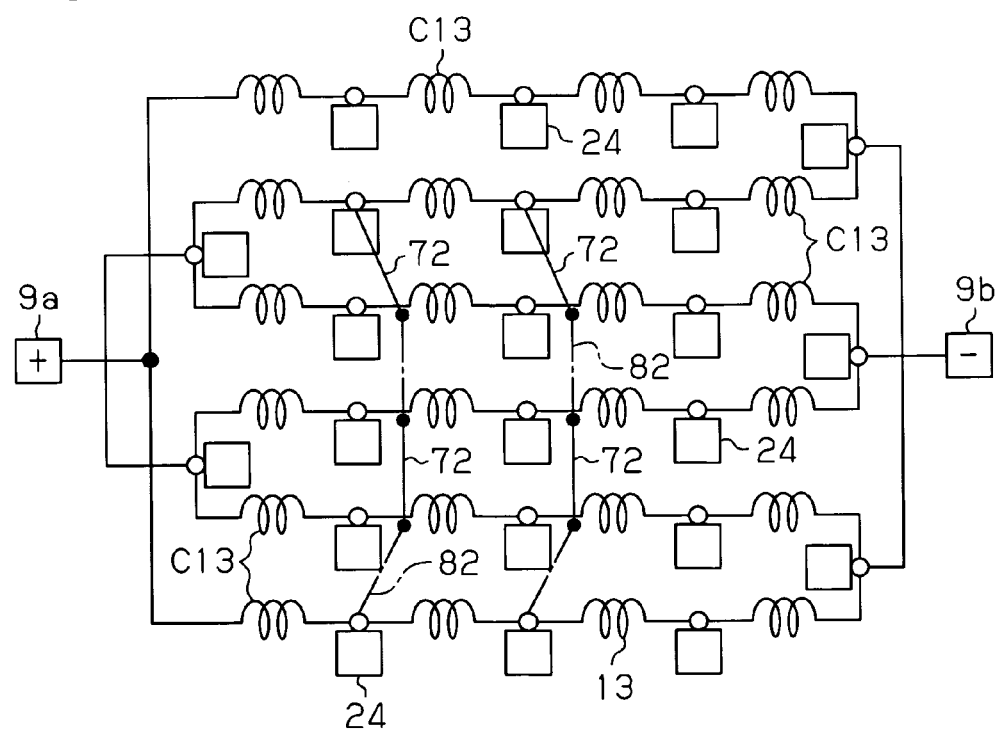
FIG. 28 is a diagram describing the connection between coils included in the DC motor according to the other example.

For example, as shown in FIG. 26, a short-circuit member assembly 122 in a commutator 321 differs from the short-circuit member assembly 62 in the second embodiment described above in that a first outer terminal 73 of each first short-circuit piece 72 includes a first engagement portion 36, and second outer terminal 83 of each second short-circuit piece 82 includes a second engagement portion 46. As shown in FIGS. 26 and 27, a wire 15 is wound around twenty four teeth T11 by performing distributed winding. The wire 15 is wound around four teeth T11 that are arranged next to one another in the circumferential direction together to form a coil C13. For example, the wire 15 is engaged with an engagement portion 46 facing toward a slot S11 denoted as slot number 24 in the radial direction and is wound in a plurality of winding around the three teeth T11 between a slot S11 denoted as slot number 23 and the slot S11 denoted as slot number 2 to form a coil C13 and is engaged with engagement portions 36 and 46 facing toward the slot S11 denoted as slot number 1 in the radial direction. The wire 15 is also wound in a plurality of windings around the three teeth T11 arranged between the slot S11 denoted as slot number 24 and a slot S11 denoted as slot number 3 to form a coil C13 and is engaged with an engagement portion 36 facing the slot S11 denoted as slot number 2 in the radial direction. In the same manner, the wire 15 skips one tooth T11 in the clockwise direction as viewed in FIG. 26 and is wound in a plurality of windings around three teeth T11 to form twenty four coils C13. As shown in FIG. 28, the twenty four coils C13 form three parallel circuits. FIG. 26 only shows only six of the twenty four coils C13. FIG. 27 shows, in a simplified manner, the wire 15 wound in a plurality of windings around only some of the teeth T11. Further, FIG. 28 shows two of the four sets of short-circuit pieces 72 and 82 that short-circuit three segments 24 arranged at intervals of 120 degrees.

Figure 29:
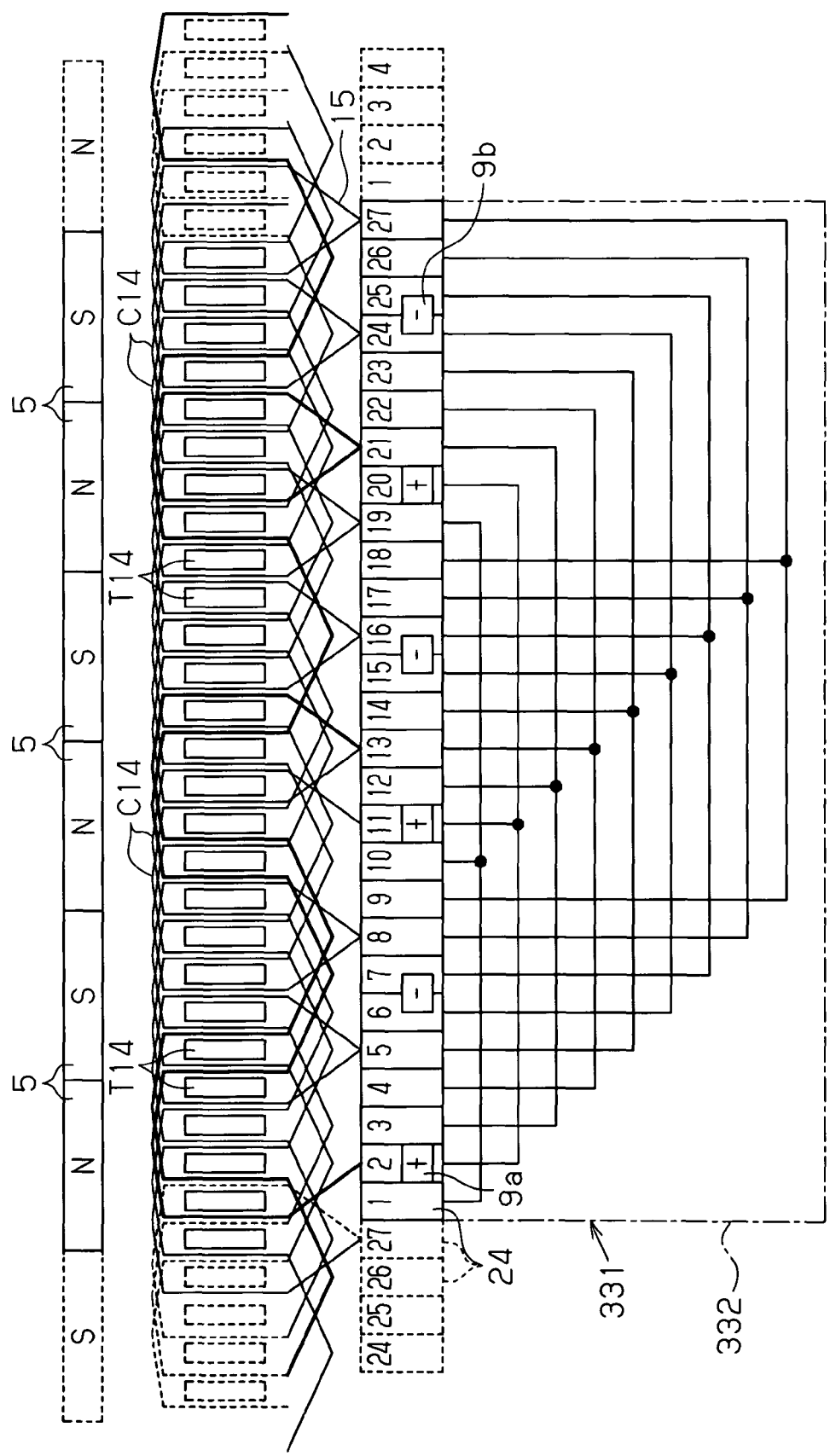
FIG. 29 is a connection wiring diagram of a DC motor according to another example.

In the DC motor 1 described in the above embodiments, the number of the magnetic poles of the stator 2 and the number of the salient poles of the armature core 12 are not limited in the described manner and may be changed when necessary. The number of the segments 24 and the number of the short-circuit pieces 32, 42, 72, and 82 in the short-circuit member assemblies 22 and 62 are changed in accordance with the number of the magnetic poles of the stator 2 and the number of the salient poles of the armature core 12. For example, a DC motor shown in FIG. 29 includes six magnets 5 and twenty seven teeth T14. In this case, a stator has six magnetic poles, and an armature core (not shown) has 27 salient poles. A commutator 331 includes twenty seven segments 24. A short-circuit member assembly 332 includes two short-circuit member groups (not shown) that are superimposed with each other in the axial direction of a rotation shaft 11. Each of the two short-circuit member groups includes eighteen short-circuit pieces (not shown) arranged in the circumferential direction. Each set of three segments 24 that are arranged at intervals of 120 degrees in the circumferential direction is short-circuited by two short-circuit pieces included in one short-circuit member group and two short-circuit pieces included in the other short-circuit member group, that is, a total of four short-circuit pieces. When the short-circuit member assembly 332 is viewed in the plate thicknesswise direction, twenty seven outer terminals (not shown) are arranged in the circumferential direction. Further, outer terminals connected to segments 24 denoted as segment numbers 2, 5, 8, 11, 13, 16, 19, 21, 24, and 27 each include an engagement portion (not shown), which projects outward in the radial direction. A wire 15 is wound around twenty-seven teeth T14 by performing overlap winding. In detail, the wire 15 is engaged with an engagement portion connected to the segment 24 denoted as segment number 2, and is wound in a plurality of windings around the set of four teeth T14 from the tooth T14 facing toward the segment 24 denoted as segment number 1 to the tooth T14 facing toward the segment 24 denoted as segment number 4 to form a coil C14. The wire 15 is also wound in a plurality of windings around four teeth T14 from the tooth T14 facing toward the segment 24 denoted as segment number 11 and the tooth T14 facing toward the segment 24 denoted as segment number 14 to form a single coil C14. The same operation is repeated a plurality of times to form twenty-seven coils C14. The wire 15 is then engaged with an engagement portion connected to the segment 24 denoted as segment number 11. FIG. 29 shows in a simplified manner the wire 15 wound in a plurality of windings around the teeth T14.

The inner terminals 34, 44, 74, and 84 may each be connected to the segments 24. In this case, the inner terminals 34 and 44 (or the inner terminals 74 and 84), the quantity of which is the same as the segments 24 that are set to the same potential, are superimposed with each other and joined to each other. Further, the outer terminals 33 (or the outer terminals 73) and the outer terminals 43 (or the outer terminals 83) are superimposed with each other and joined to each other.

Figure 30A:
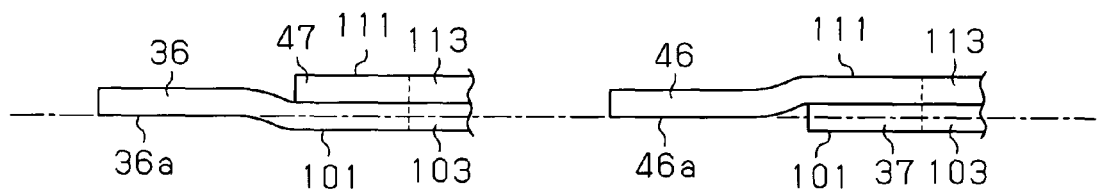
FIGS. 30A and 30B are side views of first and second engagement portions included in a short-circuit member assembly according to another example.
Figure 30B:
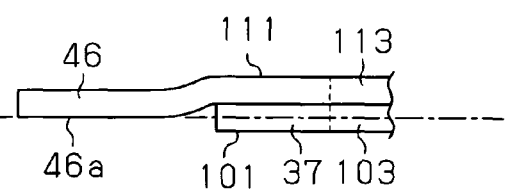
Figure 31A:
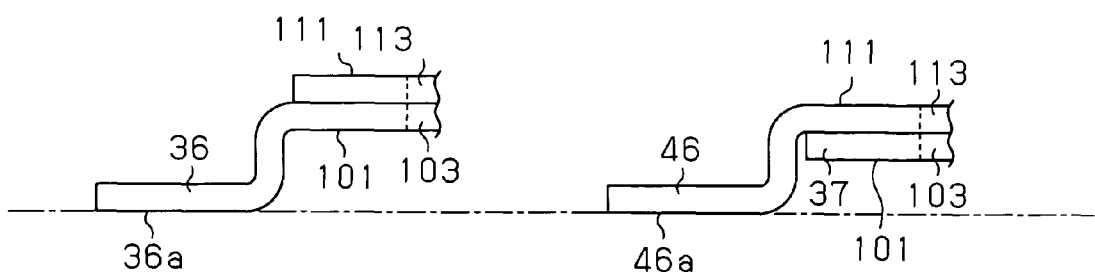
FIGS. 31A and 31B are side views of first and second engagement portions included in a short-circuit member assembly according to another example.
Figure 31B:
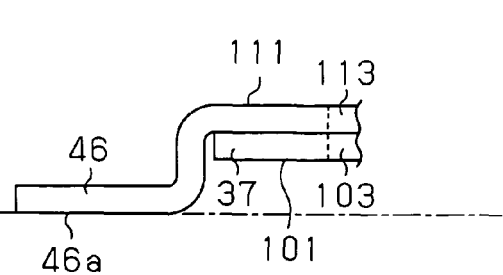

In the third embodiment, the shape of the first engagement portions 36 and the shape of second engagement portions 46 (bent shape) are not limited to the shapes described above. It is only required that the first engagement portions 36 and the second engagement portions 46 be located at the same positions with respect to a direction parallel to the axial direction of the commutator 91. For example, as shown in FIGS. 30A and 30B, the first engagement portion 36 may be bent toward the second short-circuit member group 111 in the vicinity of the distal end of the second connecting portion 47 that is arranged on the first engagement portion 36. The second engagement portion 46 may be bent toward the first short-circuit member group 101 in the vicinity of the distal end of the first connecting portion 37 that is arranged on the second engagement portion 46. The first engagement portions 36 and the second engagement portions 46 may be located at the same positions in the middle of the short-circuit member assembly 92 in the thicknesswise direction with respect to a direction parallel to the axial direction of the commutator 91. For example, as shown in FIGS. 31A and 31B, the first engagement portions 36 may be bent in a direction spaced from the second short-circuit member group 111 in the vicinity of the distal ends of the second connecting portions 47 arranged on the first engagement portions 36, and the second engagement portions 46 may be bent toward the first short-circuit member group 101 in the vicinity of the distal ends of the first connecting portions 37 arranged on the second engagement portions 46. As a result, the first engagement portions 36 and the second engagement portions 46 may be located at the same positions with respect to a direction parallel to the axial direction of the commutator 91. This structure also obtains advantage (10), which is described above. The first engagement portions 36 and the second engagement portions 46 may be located at different positions in the axial direction.

Figure 32A:
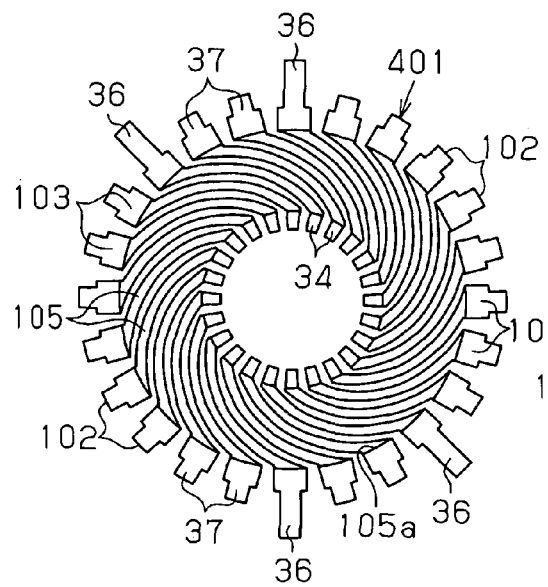
FIGS. 32A and 32B are plan views of first and second short-circuit member groups according to another example.
Figure 32B:
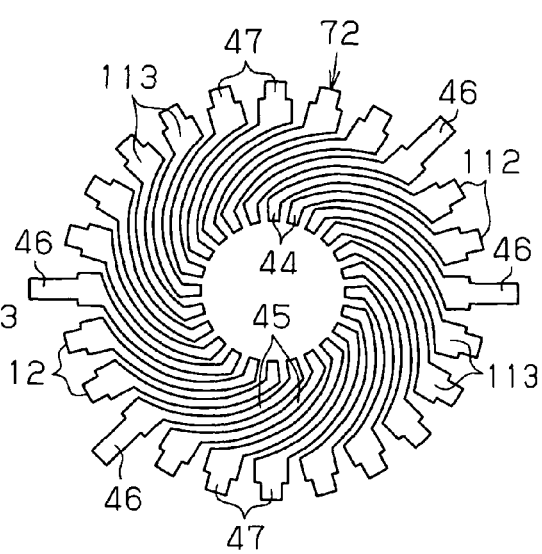

In the third embodiment, the engagement portions 36 and 46 of the short-circuit member groups 101 and 111 do not have to be arranged at equal angular intervals in the circumferential direction. It is only required that the engagement portions 36 and 46 be positioned in a manner that the distal ends of predetermined coils C1 to C8 can be short-circuited to have the same potential when the short-circuit member groups 101 and 111 are superimposed with each other. Thus, it is only required that the engagement portions 36 and 46 be formed in the short-circuit member groups 101 and 111 in a manner that the engagement portions 36 and 46 do not come in contact with each other and are arranged at equal angular intervals in the circumferential direction when the short-circuit member groups 101 and 111 are superimposed with each other. For example, a first short-circuit member group 401 shown in FIG. 32A includes a first short-circuit piece 102 including a first engagement portion 36 arranged at an upper position and a first short-circuit piece 102 including a first engagement portion 36 arranged at a lower position. Two first outer terminals 103 are arranged between the first short-circuit piece 102 including the upper first engagement portion 36 and a first short-circuit piece 102 including a first engagement portion 36 adjacent to the upper first engagement portion 36 in the counterclockwise direction. Two first outer terminals 103 are arranged between the first short-circuit piece 102 including the lower first engagement portion 36 and a first short-circuit piece 102 including an engagement portion 36 adjacent to the lower first engagement portion 36 in the counterclockwise direction. Eight first outer terminals 103 are arranged between the first short-circuit piece 102 including the upper first engagement portion 36 and the first short-circuit piece 102 including the first engagement portion 36 adjacent to the upper first engagement portion 36 in the clockwise direction. In the same manner, eight first outer terminals 103 are arranged between the first short-circuit piece 102 including the lower first engagement portion 36 and the first short-circuit piece 102 including the first engagement portion 36 adjacent to the lower first engagement portion 36 in the clockwise direction. Also, a second short-circuit member group 402 shown in FIG. 32B includes a second short-circuit piece 112 including a second engagement portion 46 arranged at a right position, and a second short-circuit piece 112 including a second engagement portion 46 arranged at a left position. Two second outer terminals 113 are arranged between the second short-circuit piece 112 including the right second engagement portion 46 and a second short-circuit piece 112 including a second engagement portion 46 adjacent to the right second engagement portion 46 in the counterclockwise direction. Two second outer terminals 113 are arranged between the second short-circuit piece 112 including the left second engagement portion 46 and a second short-circuit piece 112 including a second engagement portion 46 adjacent to the left second engagement portion 46 in the counterclockwise direction. Eight second outer terminals 113 are arranged between the second short-circuit piece 112 including the left second engagement portion 46 and the second short-circuit piece 112 including the second engagement portion 46 adjacent to the left second engagement portion 46 in the clockwise direction. Eight second outer terminals 123 are arranged between the second short-circuit piece 112 including the left second engagement portion 46 and the second short-circuit piece 112 including the second engagement portion 46 adjacent to the left second engagement portion 46 in the clockwise direction. As a result, when the first and second short-circuit member groups 401 and 412 are superimposed, a total of eight engagement portions 36 and 46 are arranged at equal angular intervals in the circumferential direction.

Figure 33A:
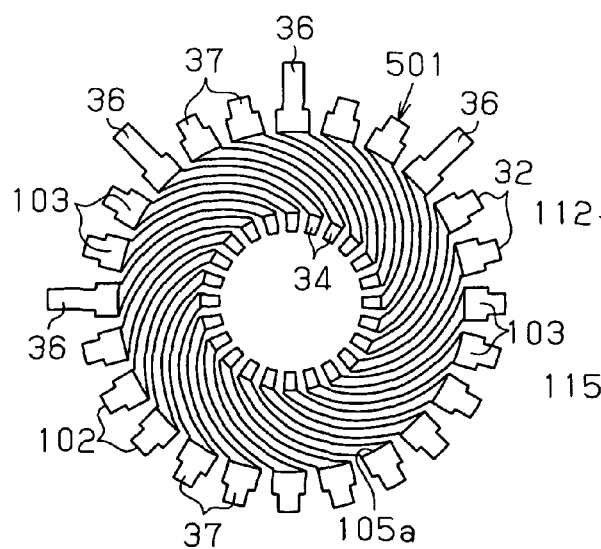
FIGS. 33A and 33B are plan views of first and second short-circuit member groups according to another example.
Figure 33B:
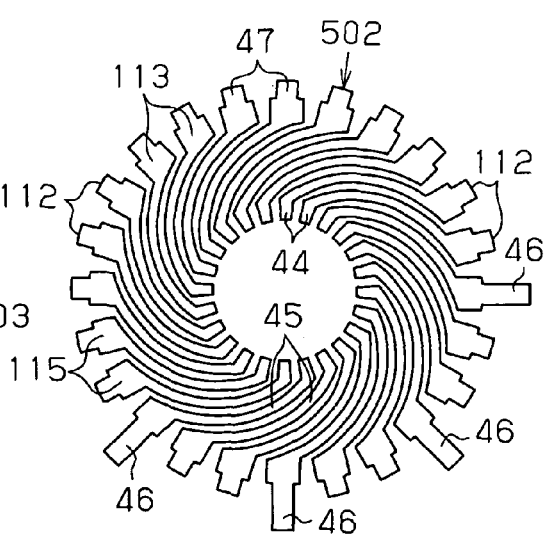

For example, a first short-circuit member group 501 has an upper half as viewed in FIG. 33A provided with four first outer terminals 103 that include first engagement portions 36. Every third one of the first outer terminals 103 in the upper half of the first short-circuit member group 501 includes a first engagement portion 36. A second short-circuit member group 112 has a lower half as viewed in FIG. 33B provided with four second outer terminals 113 that include second engagement portions 46. Every third one of the second outer terminals 113 in the lower half of the second short-circuit member group 502 includes a second engagement portion 46. As a result, when the first and second member groups 501 and 502 are superimposed with each other, a total of eight engagement portions 36 and 46 are arranged at equal angular intervals in the circumferential direction. This structure reduces waste materials when manufacturing the short-circuit member groups 401, 402, 501, and 502, and improves the yield of the short-circuit member groups 401, 402, 501, and 502.

In the third embodiment, the number of the first engagement portions 36 arranged in the first short-circuit member group 101 and the number of the second engagement portions 46 arranged in the second short-circuit member group 111 are not limited in the manner as described above. For example, five first engagement portions 36 may be arranged in the first short-circuit member group 101, and three second engagement portions 46 may be arranged in the second short-circuit member group 111. In this case, the first short-circuit member group 101 and the second short-circuit member group 111 are superimposed with each other in a manner that their first and second engagement portions 36 and 46 do not come in contact with each other and every third one of the first outer terminals 103 and every third one of the one outer terminal 113 in the circumferential direction include the projected engagement portions 36 and 46. This structure also obtains advantage (6) of the third embodiment. The three second engagement portions 46 arranged in the second short-circuit member group 111 further reduce wasted portions of the plate member 121 and improves the yield of the second short-circuit member group 111 further.

Figure 34A:
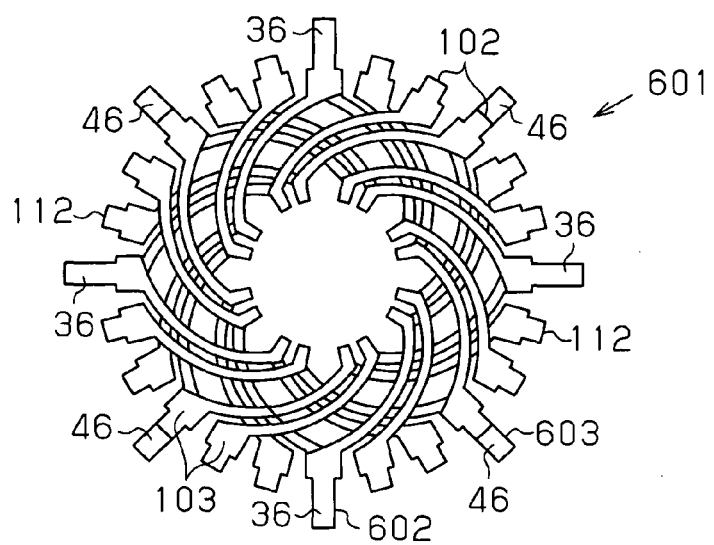
FIG. 34A is a plan view of a short-circuit member assembly according to another example.
Figure 34B:
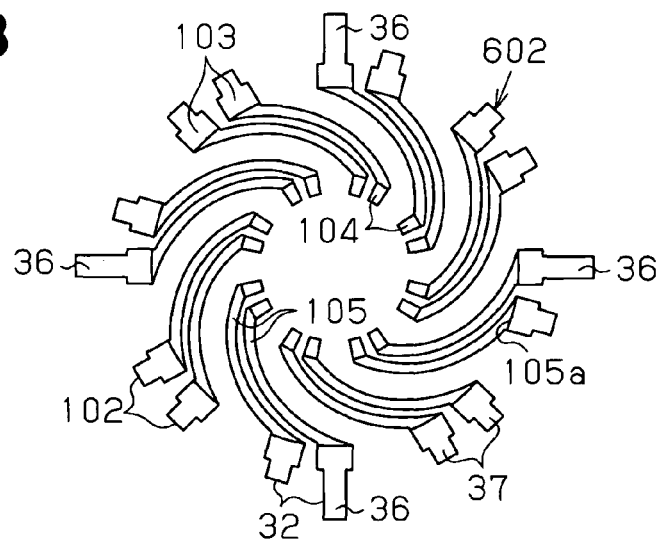
FIGS. 34B and 34C are plan views of first and second short-circuit member groups included in the short-circuit member assembly shown in FIG. 34A.
Figure 34C:
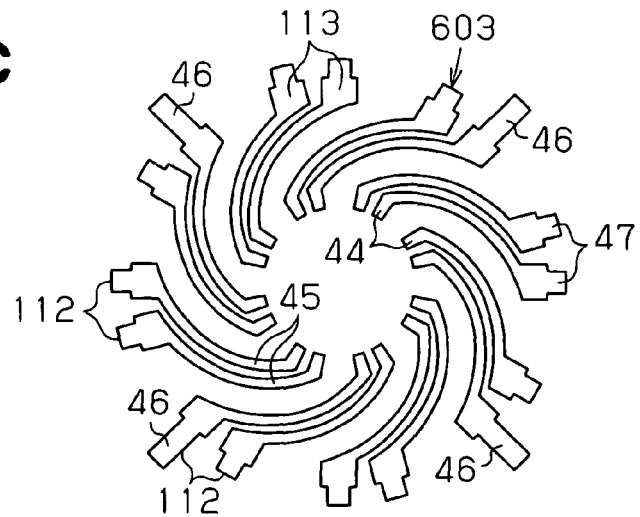

In the third embodiment, the commutator 91 may include a short-circuit member assembly 601 shown in FIG. 34A instead of the short-circuit member assembly 92. The short-circuit member assembly 601 is formed by superimposing a first short-circuit member group 602 shown in FIG. 34B and a second short-circuit member group 603 shown in FIG. 34C with each other. The first short-circuit member group 602 corresponds to the first short-circuit member group 101 of the third embodiment from which every third one of the first short-circuit pieces 102 is eliminated in a manner that the first short-circuit pieces 102 including the first engagement portions 36 remain. In the same manner, the second short-circuit member group 133 corresponds to the second short-circuit member group 111 of the third embodiment form which every third one of the second short-circuit pieces 112 is eliminated in a manner that the second short-circuit pieces 112 including the second engagement portions 46 remain. As shown in FIG. 34A, the first short-circuit member group 132 and the second short-circuit member group 133 are superimposed with each other in a manner that the eight engagement portions 36 and 46 are located at equal angular intervals in the circumferential direction. Further, the first and second outer terminals 103 and 113 superimposed with each other are welded to each other, and the first and second inner terminals 104 and 114 superimposed with each other are welded to each other. Accordingly, in the short-circuit member assembly 601, every third one of the first outer terminals 103 arranged in the circumferential direction includes the first engagement portion 36, and every third one of the second outer terminals 113 in the circumferential direction includes the second engagement portion 46.

In the third embodiment, the first short-circuit pieces 102 have the first spacing recesses 105a and the second short-circuit pieces 110 have the second spacing recesses 115a to prevent the first connecting portions 105 and the second connecting portions 115 from being short-circuited in the superimposing direction. However, the present invention is not limited to such a structure. For example, only the first short-circuit pieces 102 or the second short-circuit pieces 112 may include the spacing recesses. Alternatively, the first connecting portions 105 or the second connecting portions 115 may be curved to bulge in the plate thicknesswise direction to space the first and second connecting portions 105 and 115 from each other when the first and second short-circuit member groups 101 and 111 are superimposed with each other. Alternatively, electrical insulating paper may be arranged between the first connecting portions 105 and the second connecting portions 115.

Figure 35:
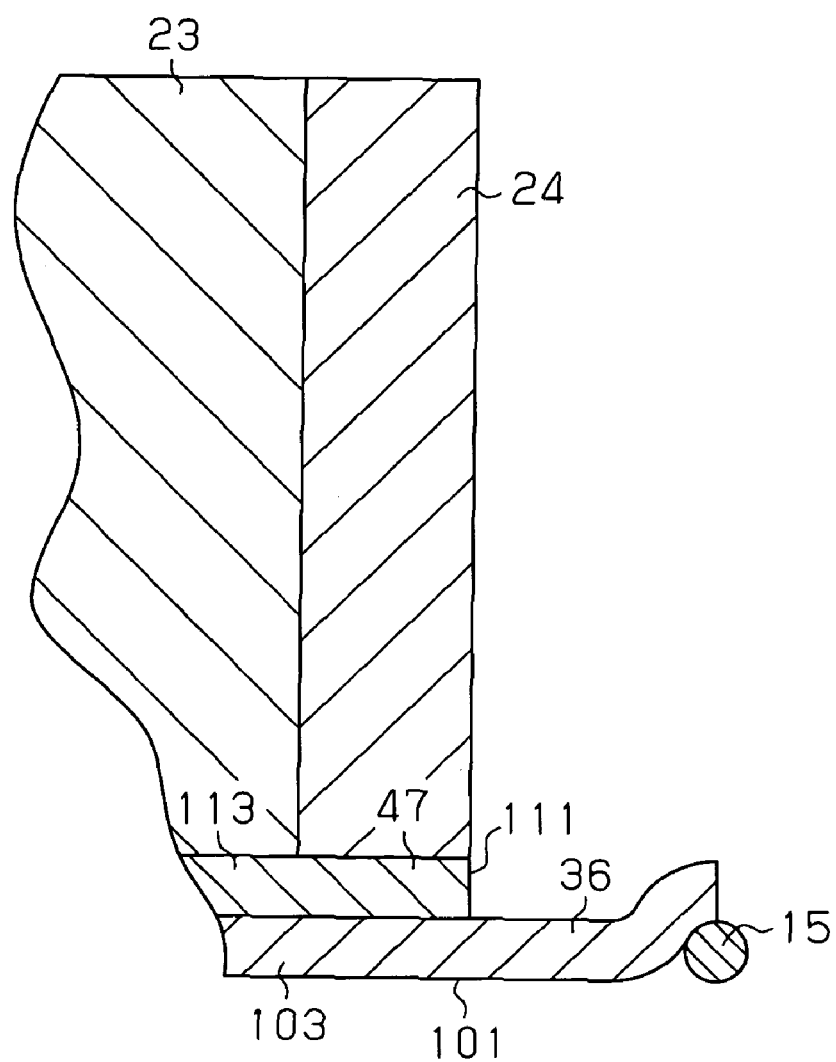
FIG. 35 is a partially enlarged cross-sectional view of a commutator according to another example.

In the third embodiment, as shown in FIG. 35, the distal ends of the coils C1 to C8, which are formed by the wire 15, may be welded to the distal ends of the corresponding first and second engagement portions 36 and 46 without bending back the first and second engagement portions 36 and 46. In this case, the first and second engagement portions 36 and 46 are connected to the distal ends of the coils C1 to C8 more easily than in the above embodiment.

What is claimed is:

1. A short-circuit member assembly for short-circuiting a plurality of segments arranged in a circumferential direction, the segments including m sets of n segments, where m and n are integers, the short-circuit member assembly including a first short-circuit member group and a second short-circuit member group superimposed with each other, the first short-circuit member group including a plurality of first short-circuit pieces arranged in the circumferential direction, the second short-circuit member group including a plurality of second short-circuit pieces arranged in the circumferential direction, with each of the short-circuit pieces including a first terminal, a second terminal located outward or inward in a radial direction from the first terminal and separated from the first terminal in the circumferential direction, and a connecting portion connecting the second terminal to the first terminal;

wherein each of the first and second short-circuit member groups includes the short-circuit pieces, the quantity of which is obtained by multiplying (n−1) by m, to short-circuit the n segments in each of the sets with (n−1) first short-circuit pieces in the first short-circuit member group and (n−1) second short-circuit pieces in the second short-circuit member group;

m first terminals in the first short-circuit member group and m first terminals in the second short-circuit member group are superimposed with each other and joined to form m first-terminal joint portions, the m first-terminal joint portions and remaining first terminals in the first and second short-circuit member groups are arranged in the circumferential direction and connected to the segments; and all of the second terminals in the first short-circuit member group and all of the second terminals in the second short-circuit member group are superimposed and joined with each other.

2. The short-circuit member assembly according to claim 1, wherein the first terminals are outer terminals located outward in the radial direction, and the second terminals are inner terminals located inward from the outer terminals in the radial direction.

3. The short-circuit member assembly according to claim 2, wherein:

the (n−1) first short-circuit pieces and the (n−1) second short-circuit pieces are connected in series by superimposing and joining the outer terminals and superimposing and joining the inner terminals so that the first short-circuit pieces and the second short-circuit pieces are alternately arranged and joint locations of the inner terminals outnumber joint locations of the outer terminals by one;

in a group having (2(n−1)) short-circuit pieces that are connected in series, when the quantity of outer joints formed by joining the outer terminals is an odd number, only the outer terminals that form the outer joints at a central portion of the outer joints include an engagement portion to which an end of an armature coil is connected; and when the quantity of outer joints is an even number, only the outer terminal that forms one of two outer joints portions arranged at a central portion of the outer joints includes an engagement portion to which an end of the armature core is connected.

4. The short-circuit member assembly according to claim 2, wherein:

the (n−1) first short-circuit pieces and the (n−1) second short-circuit pieces are connected in series by superimposing and joining the outer terminals and superimposing and joining the inner terminals so that the first short-circuit pieces and the second short-circuit pieces are alternately arranged and joint locations of the inner terminals outnumber joint locations of the outer terminals by one; and the outer terminals arranged at two ends of a group in which (2(n–1)) short-circuit pieces are connected in series each include an engagement portion to which an end of an armature coil is connected.

5. The short-circuit member assembly according to claim 2, wherein:

the (n–1) first short-circuit pieces and the (n–1) second short-circuit pieces are connected in series by superimposing and joining the outer terminals and superimposing and joining the inner terminals so that the first short-circuit pieces and the second short-circuit pieces are arranged alternately and joint locations of the inner terminals outnumber joint locations of the outer terminals by one; and 2(n–1) short-circuit pieces that are connected in series all have identical shapes and are arranged at equal angular intervals in the circumferential direction.

6. A commutator comprising:

a plurality of segments arranged in a circumferential direction; and a short-circuit member assembly;

wherein the segments include m sets of n segments, where m and n are integers;

the short-circuit member assembly includes a first short-circuit member group and a second short-circuit member group superimposed with each other, the first short-circuit member group including a plurality of first short-circuit pieces arranged in the circumferential direction, the second short-circuit member group including a plurality of second short-circuit pieces arranged in the circumferential direction, with each of the short-circuit pieces including a first terminal, a second terminal located outward or inward in a radial direction from the first terminal and separated from the first terminal in the circumferential direction, and a connecting portion connecting the second terminal to the first terminal;

each of the first and second short-circuit member groups includes the short-circuit pieces, the quantity of which is obtained by multiplying (n–1) by m, to short-circuit the n segments in each of the sets with (n–1) first short-circuit pieces in the first short-circuit member group and (n–1) second short-circuit pieces in the second short-circuit member group;

m first terminals in the first short-circuit member group and m first terminals in the second short-circuit member group are superimposed with each other and joined to form m first-terminal joint portions, the m first-terminal joint portions and remaining first terminals in the first and second short-circuit member groups are arranged in the circumferential direction and connected to the segments; and all of the second terminals in the first short-circuit member group and all of the second terminals in the second short-circuit member group are superimposed and joined with each other.

7. The commutator according to claim 6, wherein the first terminals are outer terminals located outward in the radial direction, and the second terminals are inner terminals located inward from the outer terminals in the radial direction.

8. The commutator according to claim 7, wherein:

the (n–1) first short-circuit pieces and the (n–1) second short-circuit pieces are connected in series by superimposing and joining the outer terminals and superimposing and joining the inner terminals so that the first short-circuit pieces and the second short-circuit pieces are alternately arranged and joint locations of the inner terminals outnumber joint locations of the outer terminals by one;

in a group having (2(n–1)) short-circuit pieces that are connected in series, when the quantity of outer joints formed by joining the outer terminals is an odd number, only the outer terminals that form the outer joints at a central portion of the outer joints include an engagement portion to which an end of an armature coil is connected; and when the quantity of outer joints is an even number, only the outer terminal that forms one of two outer joints portions arranged at a central portion of the outer joints includes an engagement portion to which an end of the armature core is connected.

9. The commutator according to claim 7, wherein:

the (n–1) first short-circuit pieces and the (n–1) second short-circuit pieces are connected in series by superimposing and joining the outer terminals and superimposing and joining the inner terminals so that the first short-circuit pieces and the second short-circuit pieces are alternately arranged and joint locations of the inner terminals outnumber joint locations of the outer terminals by one; and the outer terminals arranged at two ends of a group in which (2(n–1)) short-circuit pieces are connected in series each include an engagement portion to which an end of an armature coil is connected.

10. The commutator according to claim 7, wherein:

the (n–1) first short-circuit pieces and the (n–1) second short-circuit pieces are connected in series by superimposing and joining the outer terminals and superimposing and joining the inner terminals so that the first short-circuit pieces and the second short-circuit pieces are arranged alternately and joint locations of the inner terminals outnumber joint locations of the outer terminals by one; and 2(n–1) short-circuit pieces that are connected in series all have identical shapes and are arranged at equal angular intervals in the circumferential direction.

11. The commutator according to claim 6, wherein the quantity m of the sets of the segments is 8, the quantity n of the segments in each of the sets is 3, and three segments in each of the sets are arranged at an interval of 120 degrees in the circumferential direction.

12. A motor comprising:

a stator including a plurality of magnets;

a rotatable armature arranged in the stator, wherein the armature includes a rotation shaft, an armature core around which a plurality of armature coils are wound and fixed to the rotation shaft, and the commutator according to claim 6 that is fixed to the rotation shaft; and at least a pair of power feeding brushes that slide along and contact the commutator.

* * * * *